United States Patent
Iwata et al.

(10) Patent No.: US 12,401,919 B2
(45) Date of Patent: Aug. 26, 2025

(54) PHOTOELECTRIC CONVERSION DEVICE, DRIVING METHOD FOR PHOTOELECTRIC CONVERSION DEVICE, AND APPARATUS

(71) Applicant: CANON KABUSHIKI KAISHA, Tokyo (JP)

(72) Inventors: Koichiro Iwata, Kanagawa (JP); Yu Arishima, Kanagawa (JP); Masaki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 18/361,627

(22) Filed: Jul. 28, 2023

(65) Prior Publication Data

US 2024/0048862 A1 Feb. 8, 2024

(30) Foreign Application Priority Data

Aug. 2, 2022 (JP) ................. 2022-123185

(51) Int. Cl.
*H04N 25/60* (2023.01)
*H04N 25/709* (2023.01)
*H04N 25/78* (2023.01)

(52) U.S. Cl.
CPC .......... *H04N 25/60* (2023.01); *H04N 25/709* (2023.01); *H04N 25/78* (2023.01)

(58) Field of Classification Search
CPC ...... H04N 25/60; H04N 25/709; H04N 25/77; H04N 25/772; H04N 25/78
See application file for complete search history.

(56) References Cited

U.S. PATENT DOCUMENTS

| 2015/0138411 A1* | 5/2015 | Nakamura ............. H03K 5/125 327/54 |
| 2021/0112211 A1* | 4/2021 | Kumagai ............... H04N 25/78 |

FOREIGN PATENT DOCUMENTS

| JP | 2012222563 A | 11/2012 |
| JP | 2021064859 A | 4/2021 |
| JP | 2021136667 A | 9/2021 |
| JP | 2021190823 A | 12/2021 |

* cited by examiner

*Primary Examiner* — Lin Ye
*Assistant Examiner* — Chriss S Yoder, III
(74) *Attorney, Agent, or Firm* — Canon U.S.A., Inc. IP Division

(57) ABSTRACT

In a photoelectric conversion device, in a first period in which a respective different offset voltage is supplied to a comparator included in each of a plurality of AD conversion circuits, a control unit performs control to bring the offset voltage into a first driving state in which a voltage change amount per unit time of the offset voltage is a first voltage amount, and, in a second period in which a ramp signal is supplied to the comparator included in each of the plurality of AD conversion circuits, the control unit performs control to bring the ramp signal into a second driving state in which a voltage change amount per unit time of the ramp signal is a second voltage amount, wherein the first voltage amount is larger the second voltage amount.

20 Claims, 11 Drawing Sheets

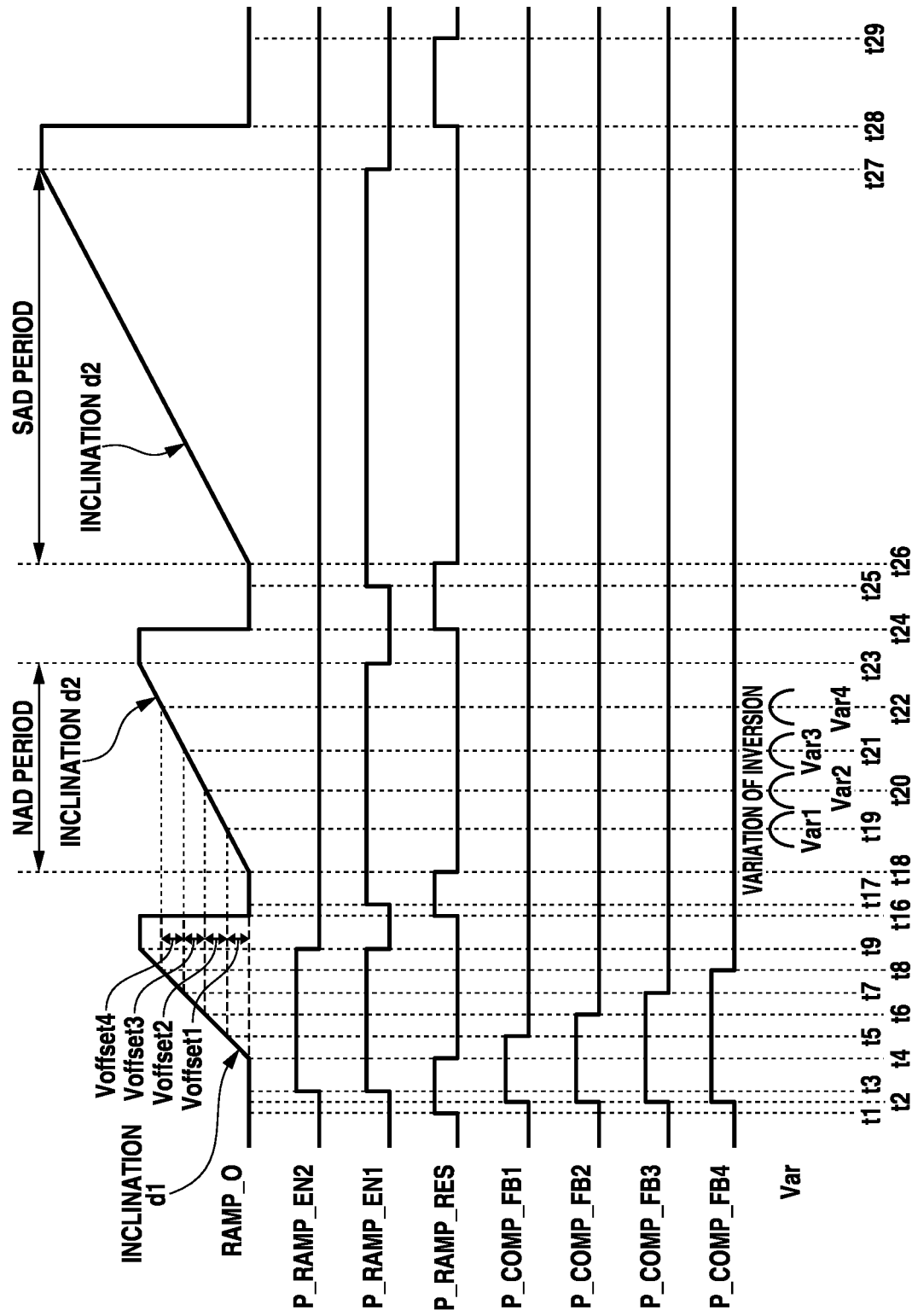

PHOTOELECTRIC CONVERSION DEVICE, DRIVING METHOD FOR PHOTOELECTRIC CONVERSION DEVICE, AND APPARATUS

BACKGROUND

Technical Field

Aspects of the embodiments generally relate to a photoelectric conversion device, a driving method for a photoelectric conversion device, and an apparatus.

Description of the Related Art

Japanese Patent Application Laid-Open No. 2012-222563 discusses a solid-state imaging device including an analog-to-digital (AD) conversion circuit which converts a pixel signal output from a pixel into a digital signal. The solid-state imaging device discussed in Japanese Patent Application Laid-Open No. 2012-222563 is configured to output a high-quality signal owing to an offset voltage being supplied to a comparator included in the AD conversion circuit.

However, the technique discussed in Japanese Patent Application Laid-Open No. 2012-222563 may decrease a frame rate depending on the circuit configuration of a photoelectric conversion device to be applied to the solid-state imaging device.

SUMMARY

According to an aspect of the embodiments, a photoelectric conversion device includes pixels arranged in matrix form and each configured to generate a pixel signal by photoelectric conversion, a plurality of analog-to-digital (AD) conversion circuits each including a comparator configured to make a comparison between the pixel signal and a ramp signal, a voltage supply circuit configured to supply an offset voltage for setting a respective different offset to the comparator included in each of the plurality of AD conversion circuits, and a control unit configured to control the ramp signal and the offset voltage, wherein, in a first period in which the respective different offset voltage is supplied to the comparator included in each of the plurality of AD conversion circuits, the control unit performs control to bring the offset voltage into a first driving state in which a voltage change amount per unit time of the offset voltage is a first voltage amount, wherein, in a second period in which the ramp signal is supplied to the comparator included in each of the plurality of AD conversion circuits, the control unit performs control to bring the ramp signal into a second driving state in which a voltage change amount per unit time of the ramp signal is a second voltage amount, and wherein the first voltage amount is larger the second voltage amount.

Further features of the disclosure will become apparent from the following description of exemplary embodiments with reference to the attached drawings.

BRIEF DESCRIPTION OF THE DRAWINGS

FIG. 7 is a drive timing chart illustrating a photoelectric conversion device according to a third exemplary embodiment.

DESCRIPTION OF THE EMBODIMENTS

Figure 1:
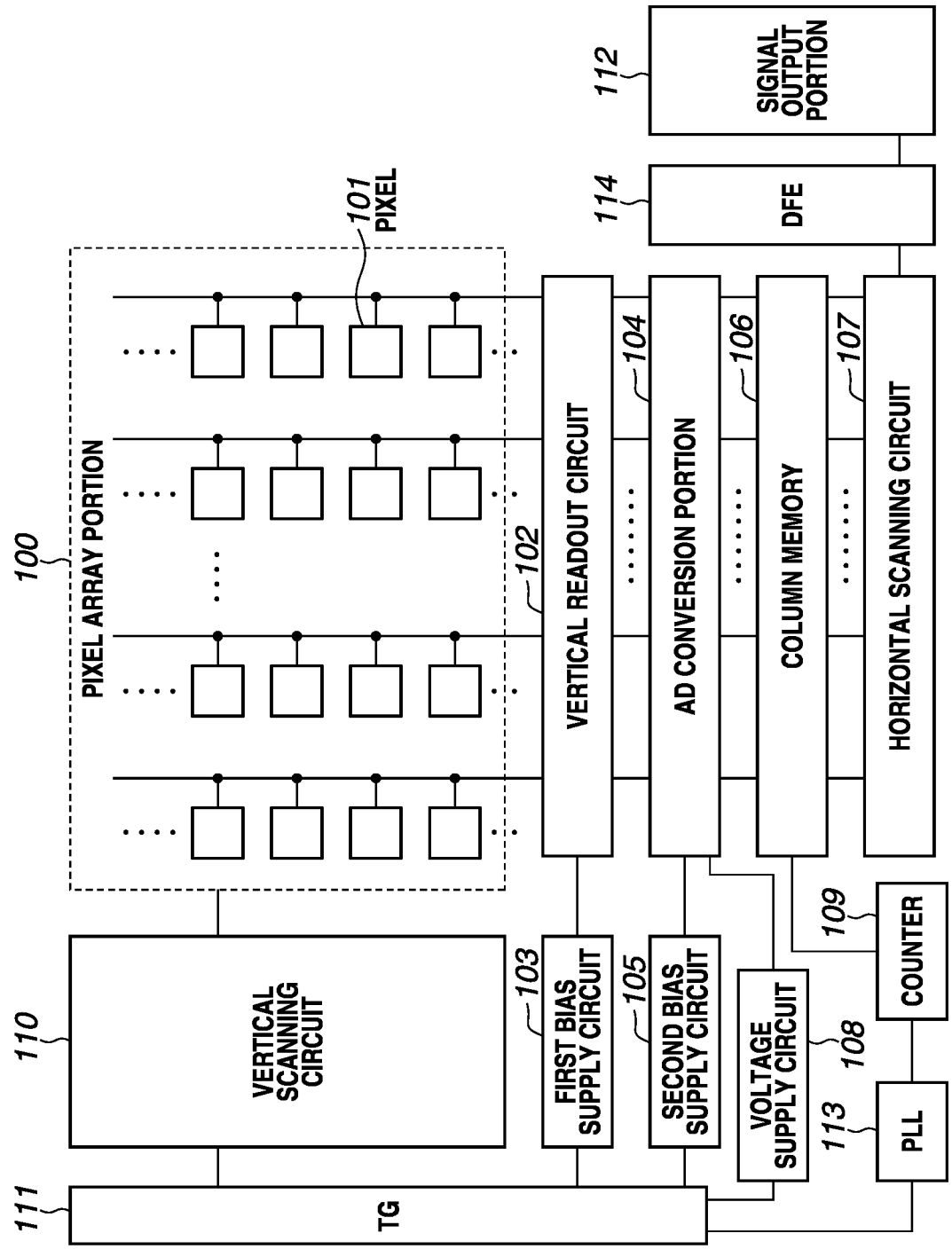
FIG. 1 is a block diagram illustrating a photoelectric conversion device according to an exemplary embodiment.

Various exemplary embodiments, features, and aspects of the disclosure will be described in detail below with reference to the drawings. Furthermore, the following exemplary embodiments are not intended to limit the disclosure set forth in claims. While a plurality of characteristics is described in each exemplary embodiment, not all of the plurality of characteristics is essential for the disclosure, and some of the characteristics can be combined in an optional manner. Additionally, in the accompany drawings, the same or similar components are assigned the respective same reference numerals, and any duplicate description is omitted. Moreover, in each exemplary embodiment described below, a sensor directed to image capturing is mainly described as an example of a photoelectric conversion device. However, each exemplary embodiment is not limited to a sensor directed to image capturing, but can be another example of a photoelectric conversion device. For example, each exemplary embodiment can be applied to an imaging device, a distance measuring device (for example, a device for focus detection or distance measurement using time of flight (TOF)), or a light metering device (for example, a device for metering of the amount of incident light).

In the present specification, terms representing specific directions or positions (for example, "up", "upward", "above", "over", "down", "downward", "below", "under", "right", "rightward", "left", and "leftward") are used as needed. Using such terms are intended to facilitate understanding of each exemplary embodiment by referring to the drawings, and the technical scope of the disclosure should not be construed to be limited by the meanings of such terms.

Each metallic member, such as a wiring or a pad, described in the present specification can be configured with a single body of metal of a given element or can be a mixture (alloy). For example, a wiring which is described as a copper wiring can be configured with a single body of copper or can be a configuration principally containing copper and further containing another component. Moreover, for example, a pad which is connected as an external terminal can be configured with a single body of aluminum or can be a configuration principally containing aluminum and further containing another component. A copper wiring or an aluminum pad mentioned here is merely an example, and can be changed to a variety of metals. Moreover, a wiring or a pad mentioned here is merely an example of a metallic member, and another type of metallic member can also be used.

A configuration which a photoelectric conversion device according to each exemplary embodiment has in common is described with reference to FIG. 1 and FIG. 2.

FIG. 1 is an example of a block diagram illustrating an outline configuration of a photoelectric conversion device which is used in each exemplary embodiment.

The photoelectric conversion device includes a pixel array portion 100. The pixel array portion 100 includes pixels 101 arranged in matrix form over a plurality of rows and a plurality of columns. In each of the plurality of pixels 101, a photoelectric conversion portion, which generates a signal charge upon receiving incident light, is arranged as described below. Each of the plurality of pixels 101 generates a pixel signal based on the signal charge. The pixel array portion 100 is provided with a plurality of signal lines arranged in such a way as to correspond to each column of pixels 101. A vertical scanning circuit 110 selects pixels 101 on a row-by-row basis. Each pixel 101 present on the row selected by the vertical scanning circuit 110 outputs a pixel signal generated based on the signal charge to a corresponding signal line.

The photoelectric conversion device includes a vertical readout circuit 102. The vertical readout circuit 102 performs supplying of current to a signal line required for readout of a signal from each pixel 101. Moreover, the vertical readout circuit 102 performs supplying of current to a signal line and signal processing with respect to a pixel signal which is output from each pixel 101 via a signal line. The signal processing which the vertical readout circuit 102 performs includes, for example, amplification of a signal, noise reduction of a signal (correlated double sampling), and sample-and-hold processing.

The photoelectric conversion device includes a first bias supply circuit 103. The first bias supply circuit 103 performs supplying of a voltage and a current to the vertical readout circuit 102.

The photoelectric conversion device includes an analog-to-digital (AD) conversion portion 104, a second bias supply circuit 105, a column memory 106, a horizontal scanning circuit 107, a voltage supply circuit 108, and a counter 109. The second bias supply circuit 105 supplies a voltage and a current to the AD conversion portion 104. The voltage supply circuit 108 generates a ramp signal, which is a signal the voltage of which changes in association with the passing of time, and supplies the ramp signal to the AD conversion portion 104. The AD conversion portion 104 outputs, to the column memory 106, a comparison result signal, which represents a result obtained by comparing a pixel signal output from the vertical readout circuit 102 with the ramp signal.

The vertical readout circuit 102 is an analog signal output portion which outputs a pixel signal being an analog signal to the AD conversion portion 104.

The counter 109 generates a count signal representing the passing of time with use of a pulse signal output from a phase-locked loop (PLL) circuit 113, and outputs the count signal to the column memory 106.

The column memory 106 retains a count signal output from the counter 109 based on a change of the signal level of a comparison result signal output from the AD conversion portion 104. Accordingly, in the column memory 106, a count signal of the signal value corresponding to the value of a pixel signal is retained as a digital signal corresponding to the pixel signal.

The horizontal scanning circuit 107 scans the column memory 106 for every column and reads out a digital signal from the column memory 106 arranged in association with each column of pixels 101 to a digital front end (DFE) 114. The DFE 114 performs various digital signal processing operations, such as amplification, noise reduction, addition, and correction, with respect to the read-out digital signal. The DFE 114 outputs the processed digital signal to a signal output portion 112. The signal output portion 112 outputs a digital signal to the outside of the photoelectric conversion device.

The photoelectric conversion device includes a timing generator (TG) 111. The TG 111 outputs respective control signals to the vertical scanning circuit 110, the first bias supply circuit 103, the second bias supply circuit 105, the voltage supply circuit 108, and the PLL circuit 113, thus controlling their operations. Thus, the TG 111 is a control unit which controls the voltage supply circuit 108.

Figure 2:
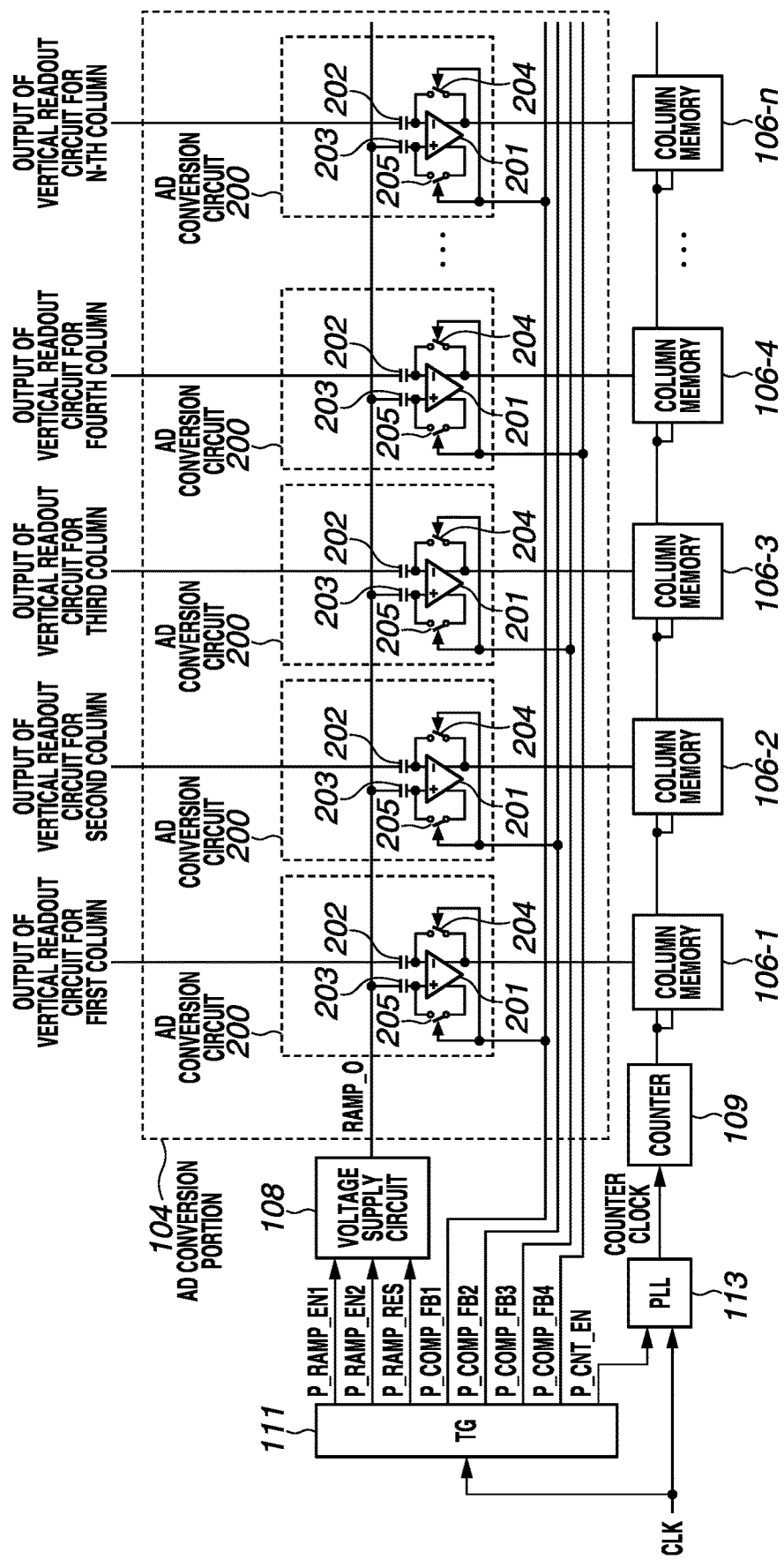
FIG. 2 is a circuit diagram illustrating the photoelectric conversion device according to the exemplary embodiment.

FIG. 2 is an example of a circuit diagram illustrating the AD conversion portion 104 of the photoelectric conversion device, which is applied to each exemplary embodiment.

FIG. 2 illustrates, in addition to the AD conversion portion 104, the column memory 106, the voltage supply circuit 108, the counter 109, the TG 111, and the PLL circuit 113. Moreover, the AD conversion portion 104 can be configured to include an AD conversion circuit 200 for every column.

Control signals P_RAMP_EN1, P_RAMP_EN2, and P_RAMP_RES are supplied from the TG 111 to the voltage supply circuit 108. A reference signal RAMP_O for AD conversion is supplied from the voltage supply circuit 108 to the AD conversion circuit 200. The AD conversion circuit 200 includes a comparator 201, capacitative elements 202 and 203, and switches 204 and 205. A pixel signal is input from the vertical readout circuit 102 for a corresponding column to an inverting input terminal (first input terminal), which is one input node, of the comparator 201 via the capacitative element 202 (first capacitative element). Moreover, the reference signal RAMP_O is input to a non-inverting input terminal (second input terminal), which is the other input node, of the comparator 201 via the capacitative element 203 (second capacitative element).

The comparator 201 compares the pixel signal and the reference signal RAMP_O with each other, and outputs a comparison result signal representing a result of comparison to the column memory 106 for the corresponding column. Furthermore, the reference signal RAMP_O includes a ramp signal. Moreover, since the voltage supply circuit 108 is controlled by the TG 111, a ramp signal which the voltage supply circuit 108 supplies is also controlled by the TG 111.

The switches 204 and 205 are controlled by signals which are input from the TG 111. In response to the switches 204 and 205 being turned on, the electric charges of the capacitative elements 202 and 203 are reset, so that resetting of the comparator 201 is performed. Furthermore, control signals P_COMP_FB1 and P_COMP_FB2 are supplied from the TG 111 to the switches 204 and 205 of the AD conversion circuits 200 for the (4N+1)-th column and the (4N+2)-th column, respectively. Moreover, control signals P_COMP_FB3 and P_COMP_FB4 are supplied from the TG 111 to the switches 204 and 205 of the AD conversion circuits 200 for the (4N+3)-th column and the (4N+4)-th column, respectively. Here, N is assumed to be equal to 0, 1, 2, ..., (the number of columns of the column circuit/4).

Here, an example in which four control signals are respectively supplied to the AD conversion circuits 200 for the (4N+1)-th column, the (4N+2)-th column, the (4N+3)-th column, and the (4N+4)-th column are used for description. However, the number of control signals can be other than four. For example, a configuration in which two control signals are respectively supplied to the AD conversion circuits 200 for the (2N+1)-th column and the (2N+2)-th column can be employed.

A clock signal CLK serving as a reference clock is input to the TG 111 and the PLL circuit 113. The TG 111 supplies a control signal P_CNT_EN to the PLL circuit 113. The PLL circuit 113 supplies, to the counter 109, a pulse signal serving as a counter clock for causing the counter 109 to operate. The counter 109 generates a count signal by counting the pulse signal serving as a counter clock. The counter 109 supplies the count signal to column memories 106-1 to 106-$n$ for the respective columns.

A photoelectric conversion device according to a first exemplary embodiment of the disclosure is described with reference to FIG. 3 and FIG. 4. Furthermore, constituent elements similar to those illustrated in FIG. 1 and FIG. 2 are assigned the respective same reference characters, and the description of these constituent elements may be omitted or simplified. Moreover, the outline configuration of the photoelectric conversion device according to the first exemplary embodiment is as described above with reference to FIG. 1 and FIG. 2.

The following description focuses on characteristic points of view in the first exemplary embodiment with regard to a photoelectric conversion device having the outline configuration illustrated in FIG. 1 and FIG. 2.

Figure 3:
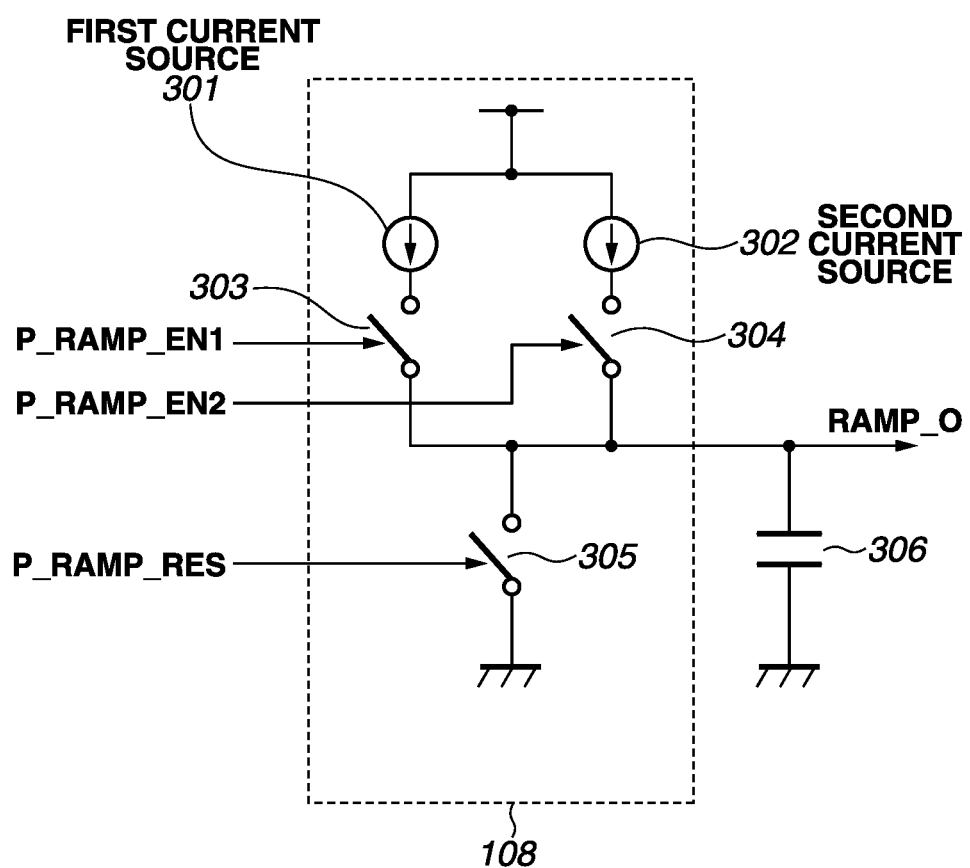
FIG. 3 is a circuit diagram illustrating a photoelectric conversion device according to a first exemplary embodiment.

FIG. 3 is an example of a circuit diagram of the voltage supply circuit 108 according to the first exemplary embodiment.

Each of a first current source 301 and a second current source 302 is a variable current source, which supplies a current the amount of which is variable, so that a plurality of current sources is arranged in the voltage supply circuit 108. Turning-on and turning-off of switches 303 and 304 are controlled by the control signals P_RAMP_EN1 and P_RAMP_EN2 supplied from the TG 111. In response to one of or both of the switches 303 and 304 being turned on, a capacitative element 306 (third capacitative element) is charged. In response to the capacitative element 306 being charged by a current, the reference signal RAMP_O is generated. Moreover, turning-on and turning-off of a switch 305 are controlled by the control signal P_RAMP_RES supplied from the TG 111. In response to the switch 305 being turned on, the electric charge of the capacitative element 306 is discharged to a grounding electrode GND. With this discharging, the electric charge of the capacitative element 306 is reset, so that the reference signal RAMP_O is reset.

Furthermore, the reference signal RAMP_O can be generated not by charging of the capacitative element 306 but by discharging of the capacitative element 306. In this case, the reference signal RAMP_O is generated by, first, preliminarily charging the capacitative element 306 to a source voltage and, then, discharging the electric charge.

Furthermore, the configuration of the voltage supply circuit 108 is not limited to that illustrated in FIG. 3. For example, in a configuration including a digital-to-analog converter having a plurality of resistors, these resistors are switched over with the use of the digital-to-analog converter. The reference signal RAMP_O can be generated by such driving.

Figure 4:
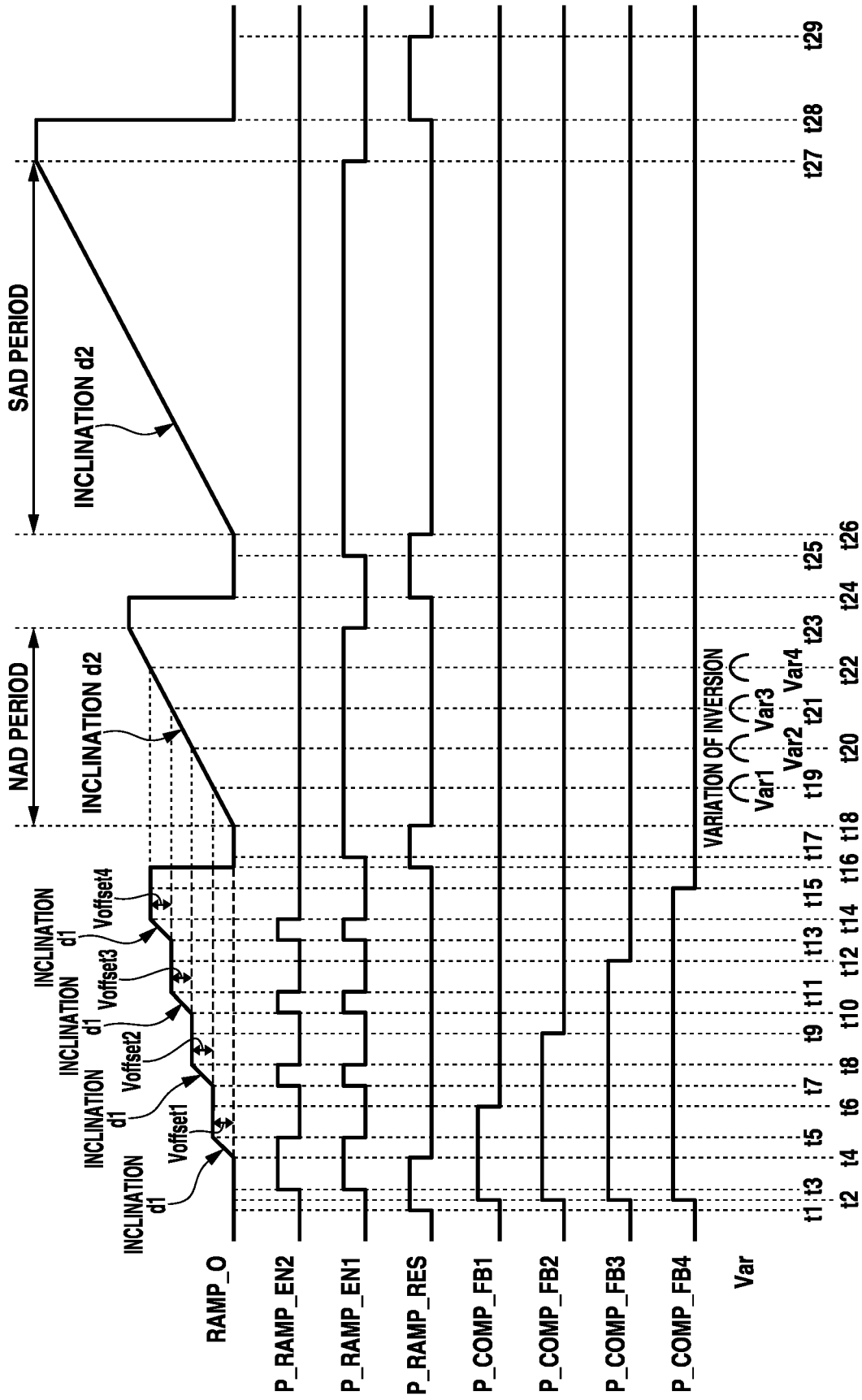
FIG. 4 is a drive timing chart illustrating the photoelectric conversion device according to the first exemplary embodiment.

FIG. 4 is an example of a timing chart illustrating driving of the voltage supply circuit 108 according to the first exemplary embodiment.

In a period from time t2 to time t23, the vertical readout circuit 102 outputs a signal at reset level output from the pixel 101 to the AD conversion portion 104. Then, in a period from time t26 to time t27, the vertical readout circuit 102 outputs a photoelectric conversion signal output from the pixel 101.

Here, a signal at reset level and a photoelectric conversion signal, which the pixel 101 outputs, are described. Typically, the pixel 101 includes a photodiode, which is a photoelectric conversion portion, a transfer transistor, a floating diffusion portion, an amplification transistor, a selection transistor, and a reset transistor. In the transfer transistor, a primary node of one of the source and the drain is connected to the photoelectric conversion portion and a primary node of the other is connected to the floating diffusion portion. The floating diffusion portion is connected to the gate of the amplification transistor. A source voltage is given to the drain of the amplification transistor, and the source of the amplification transistor is connected to a primary node of one of the source and drain of the selection transistor.

A primary node of the other of source and drain of the selection transistor is connected to a signal line provided in connection with a column of pixels 101. A source voltage is given to a primary node of one of the source and drain of the reset transistor, and a primary node of the other is connected to the floating diffusion portion. The respective gates of the transfer transistor, the reset transistor, and the selection transistor are controlled by the vertical scanning circuit 110. Furthermore, the above-mentioned typical configuration of the pixel 101 can further include a different transistor, and does not need to include part of the above-mentioned transistors. For example, a configuration obtained by excluding the transfer transistor and the selection transistor from the above-mentioned configuration can be employed.

In response to the reset transistor being turned on, the floating diffusion portion is reset to a voltage that is based on a source voltage. Then, in response to the reset transistor being turned off, resetting of the floating diffusion portion is canceled. A signal at reset level which the pixel 101 outputs is a signal which the amplification transistor outputs in conformity with a voltage of the floating diffusion portion the resetting of which has been canceled. The signal at reset level is a signal containing a noise component of the pixel 101.

After that, in response to the transfer transistor being turned on, a signal charge generated by the photodiode photoelectrically converting incident light is transferred to the floating diffusion portion. Here, the signal charge is assumed to be electrons. The amplification transistor outputs, as a photoelectric conversion signal, a signal corresponding to the voltage of the floating diffusion portion to which the signal charge has been transferred. A pixel signal which the pixel 101 outputs includes a signal at reset level and a photoelectric conversion signal.

In the description of the first exemplary embodiment, the vertical readout circuit 102 is assumed to have the function of inverting and amplifying a pixel signal. Thus, with regard to the photoelectric conversion signal, as the amount of light incident on the photodiode increases, the voltage thereof becomes smaller. On the other hand, with regard to a signal which the vertical readout circuit 102 outputs, which is a signal obtained by inverting and amplifying the photoelectric conversion signal, therefore, as the amount of incident light increases, the voltage thereof becomes larger. The signal at reset level which the pixel 101 outputs is referred to as an "N-signal", and the photoelectric conversion signal which the pixel 101 outputs is referred to as an "S-signal". Moreover, a signal which the vertical readout circuit 102 outputs and is obtained by inverting and amplifying the N-signal is referred to as an "amplified N-signal", and a signal which the vertical readout circuit 102 outputs and is obtained by inverting and amplifying the S-signal is referred to as an "amplified S-signal".

Furthermore, the vertical readout circuit 102 does not need to have the function of inverting and amplifying a pixel signal. In that case, with regard to a signal which the vertical readout circuit 102 outputs, as the amount of incident light increases, the voltage thereof becomes smaller. Therefore, in one embodiment, control is to be performed in such a manner that the direction of change of the reference signal RAMP_O changes from a high voltage to a low voltage. For example, the reference signal RAMP_O can be generated by discharging electric charge from the capacitative element 306 charged to a source voltage.

At time t1, the signal P_RAMP_RES becomes at high level (hereinafter referred to as "high"). This causes the switch 305 to be turned on. This causes the voltage of the reference signal RAMP_O to be reset to the grounding voltage GND.

At time t2, the signal P_COMP_FB1, the signal P_COMP_FB2, the signal P_COMP_FB3, and the signal P_COMP_FB4 become high. This causes the switches 204 and 205 of the AD conversion portion 104 to be turned on, so that the comparator 201 is reset.

At time t3, the signal P_RAMP_EN1 and the signal P_RAMP_EN2 become high. This causes the switches 303 and 304 to be turned on. Accordingly, the first current source 301 and the second current source 302 supply currents to the capacitative element 306. However, since the switch 305 is in a turned-on state, charging of the capacitative element 306 is not performed, so that the reference signal RAMP_O remains set to the grounding voltage GND.

At time t4, the signal P_RAMP_RES becomes at low level (hereinafter referred to as "low"), so that the switch 305 is turned off. This causes charging of the capacitative element 306 with currents supplied from the first current source 301 and the second current source 302 to be started. Here, the inclination of the reference signal RAMP_O obtained when the capacitative element 306 is being charged by both the first current source 301 and the second current source 302 is referred to as a "first inclination d1 (first voltage amount)" (first driving state). Furthermore, the inclination is equivalent to the amount of voltage change of the reference signal RAMP_O per unit time.

At time t5, the signal P_RAMP_EN1 and the signal P_RAMP_EN2 become low, so that the switches 303 and 304 are turned off. This causes charging of the capacitative element 306 with currents supplied from the first current source 301 and the second current source 302 to be ended. Moreover, the reference signal RAMP_O obtained when charging of the capacitative element 306 is ended at time t5 is referred to as "RAMP_O1".

Here, the voltage of the reference signal RAMP_O obtained when the capacitative element 306 has been charged for an optional period is denoted as "VoffsetX". Furthermore, X is assumed to be equal to 1, 2, 3, . . . (natural number). The voltage supply circuit 108 supplies an offset voltage (VoffsetX) for setting a respective different offset to the comparator 201 for each column. Then, the supplied offset voltage is clamped to the comparator 201, so that the comparator 201 is reset. The clamped offset voltage becomes a reference voltage for a circuit operation of the comparator 201 in an AD conversion period. Furthermore, since the voltage supply circuit 108 is controlled by the TG 111, the offset voltage which the voltage supply circuit 108 supplies is also controlled by the TG 111.

Furthermore, an operation of clamping the offset voltage to the comparator 201 (a reset operation for the comparator 201) is denoted as an "offset clamp operation". Thus, during the offset clamp operation, a circuit operation in which the reference signal RAMP_O and a pixel signal output from the vertical readout circuit 102 in the same period become relatively equal to each other is performed.

A change in voltage with time of the reference signal RAMP_O may be low in linearity at the beginning of start of the change. AD conversion using such a region in which the linearity of the reference signal RAMP_O is low decreases in accuracy. Therefore, clamping an offset voltage to the comparator 201 included in the AD conversion circuit 200 before the start of AD conversion brings about an effect in which it is possible to use a region excellent in the linearity of the reference signal RAMP_O. Moreover, a period in which to perform a series of driving operations for clamping an offset voltage to the comparator 201, such as from time t4 to t16, is denoted as a "comparator offset period (a first period)". Furthermore, in the comparator offset period in the first exemplary embodiment, when an offset voltage is clamped to the comparator 201, charging of the capacitative element 306 is at a stop.

Here, when a voltage used to charge the capacitative element 306 in a period from time t4 to time t5 is denoted as "Voffset1", the following formula holds:

$$\text{RAMP\_O1} = \text{Voffset1} \tag{1}$$

At time t6, the signal P_COMP_FB1 becomes low. The reference signal RAMP_O1 (Voffset1) and the output of the vertical readout circuit 102 for the (4N+1)-th column at this time t6 are clamped to the capacitative elements 203 and 202 for the (4N+1)-th column, respectively. This causes resetting of the comparator 201 to be completed.

At time t7, the signal P_RAMP_EN1 and the signal P_RAMP_EN2 become high, so that the switches 303 and 304 are turned on. Additionally, at time t8, the signal P_RAMP_EN1 and the signal P_RAMP_EN2 become low, so that the switches 303 and 304 are turned off. This causes the capacitative element 306 to be charged again with currents supplied from the first current source 301 and the second current source 302 in a period from time t7 to time t8. Here, the inclination of the reference signal RAMP_O in this period becomes the first inclination d1 as with the inclination of the reference signal RAMP_O in a period from time t4 to time t5.

Here, the reference signal RAMP_O obtained when charging of the capacitative element 306 is ended at time t8 is denoted as "RAMP_O2". Moreover, when a voltage used to charge the capacitative element 306 in a period from time t7 to time t8 is denoted as "Voffset2", the following formula holds:

$$\text{RAMP\_O2} = \text{RAMP\_O1} + \text{Voffset2} \tag{2}$$

At time t9, the signal P_COMP_FB2 becomes low. The reference signal RAMP_O2 and the output of the vertical readout circuit 102 for the (4N+2)-th column at this time t9 are clamped to the capacitative elements 203 and 202 for the (4N+2)-th column, respectively. This causes resetting of the comparator 201 to be completed.

At time t10, the signal P_RAMP_EN1 and the signal P_RAMP_EN2 become high, so that the switches 303 and 304 are turned on. Additionally, at time t11, the signal P_RAMP_EN1 and the signal P_RAMP_EN2 become low, so that the switches 303 and 304 are turned off. This causes the capacitative element 306 to be charged again with currents supplied from the first current source 301 and the second current source 302 in a period from time t10 to time t11. Here, the inclination of the reference signal RAMP_O in this period becomes the first inclination d1 as with the inclination of the reference signal RAMP_O in a period from time t4 to time t5.

Here, the reference signal RAMP_O obtained when charging of the capacitative element 306 is ended at time t11 is denoted as "RAMP_O3". Moreover, when a voltage used to charge the capacitative element 306 in a period from time t10 to time t11 is denoted as "Voffset3", the following formula holds:

$$RAMP\_O3 = RAMP\_O2 + Voffset3 \qquad (3).$$

At time t12, the signal P_COMP_FB3 becomes low. The reference signal RAMP_O3 and the output of the vertical readout circuit 102 for the (4N+3)-th column at this time t12 are clamped to the capacitative elements 203 and 202 for the (4N+3)-th column, respectively. This causes resetting of the comparator 201 to be completed.

At time t13, the signal P_RAMP_EN1 and the signal P_RAMP_EN2 become high, so that the switches 303 and 304 are turned on. Additionally, at time t14, the signal P_RAMP_EN1 and the signal P_RAMP_EN2 become low, so that the switches 303 and 304 are turned off. This causes the capacitative element 306 to be charged again with currents supplied from the first current source 301 and the second current source 302 in a period from time t13 to time t14. Here, the inclination of the reference signal RAMP_O in this period becomes the first inclination d1 as with the inclination of the reference signal RAMP_O in a period from time t4 to time t5.

Here, the reference signal RAMP_O obtained when charging of the capacitative element 306 is ended at time t14 is denoted as "RAMP_O4". Moreover, when a voltage used to charge the capacitative element 306 in a period from time t13 to time t14 is denoted as "Voffset4", the following formula holds:

$$RAMP\_O4 = RAMP\_O3 + Voffset4 \qquad (4).$$

At time t15, the signal P_COMP_FB4 becomes low. The reference signal RAMP_O4 and the output of the vertical readout circuit 102 for the (4N+4)-th column at this time t15 are clamped to the capacitative elements 203 and 202 for the (4N+4)-th column, respectively. This causes resetting of the comparator 201 to be completed.

At time t16, the signal P_RAMP_RES becomes high. This causes the switch 305 to be turned on, so that the electric charge of the capacitative element 306 is discharged to the grounding electrode GND. This causes the reference signal RAMP_O to be reset to the grounding voltage GND.

At time t17, the signal P_RAMP_EN1 becomes high, so that the switch 303 is turned on.

This causes the first current source 301 to supply a current to the capacitative element 306. However, since the switch 305 is in a turned-on state, charging of the capacitative element 306 is not performed, so that the reference signal RAMP_O remains set to the grounding voltage GND.

At time t18, the signal P_RAMP_RES becomes low, so that the switch 305 is turned off.

This causes charging of the capacitative element 306 with a current supplied from the first current source 301 to be started. This causes the reference signal RAMP_O to change in voltage with time. Thus, a ramp signal is generated. Here, an inclination of the reference signal RAMP_O obtained when the capacitative element 306 is being charged by the first current source 301 is referred to as a "second inclination d2 (second voltage amount)" (second driving state). Furthermore, the inclination is equivalent to the amount of voltage change of the reference signal RAMP_O per unit time. Moreover, the second inclination d2 is smaller than the first inclination d1.

At time t23, the signal P_RAMP_EN1 becomes low, so that the switch 303 is turned off.

This causes charging of the capacitative element 306 with a current supplied from the first current source 301 to be ended.

Thus, at the time of charging of the capacitative element 306 in a comparator offset period, currents are supplied from both the first current source 301 and the second current source 302. Then, in a period from time t18 to time t23, the capacitative element 306 is charged with a current supplied from the first current source 301.

In other words, at the time of charging of the capacitative element 306 in a comparator offset period, the reference signal RAMP_O has the first inclination d1. Then, in a period from time t18 to time t23, the reference signal RAMP_O has the second inclination d2. Moreover, the first inclination d1 is larger than the second inclination d2. Furthermore, in a comparator offset period, the inclination of the reference signal RAMP_O obtained when charging of the capacitative element 306 is at a stop can be regarded as zero if the influence of, for example, noise is excluded.

In a period from time t18 to time t23, the vertical readout circuit 102 is outputting the amplified N-signal. The period from time t18 to time t23, which is a period in which the amplified N-signal is AD-converted, is denoted as an "NAD period (an example of a second period)". In the NAD period, the comparator 201 is inverted depending on a result of comparison between the amplified N-signal and the ramp signal input to the comparator 201.

Furthermore, the details of a period from time t19 to time t22 included in the NAD period are described below.

At time t24, the signal P_RAMP_RES becomes high. This causes the switch 305 to be turned on, so that the electric charge of the capacitative element 306 is discharged to the grounding electrode GND. This causes the reference signal RAMP_O to be reset to the grounding voltage GND.

At time t25, the signal P_RAMP_EN1 becomes high, so that the switch 303 is turned on.

This causes the first current source 301 to supply a current to the capacitative element 306. However, since the switch 305 is in a turned-on state, charging of the capacitative element 306 is not performed, so that the reference signal RAMP_O remains set to the grounding voltage GND.

At time t26, the signal P_RAMP_RES becomes low, so that the switch 305 is turned off.

This causes charging of the capacitative element 306 with a current supplied from the first current source 301 to be started. This causes the reference signal RAMP_O to change in voltage with time. Thus, a ramp signal is generated.

At time t27, the signal P_RAMP_EN1 becomes low, so that the switch 303 is turned off.

This causes charging of the capacitative element 306 with a current supplied from the first current source 301 to be ended. Here, the inclination of the reference signal RAMP_O in a period from time t26 to time t27 becomes the second inclination d2 as with the inclination of the reference signal RAMP_O in a period from time t18 to time t23.

In a period from time t26 to time t27, the vertical readout circuit 102 is outputting the amplified S-signal. The period from time t26 to time t27 is a period in which the amplified S-signal is AD-converted. This period is denoted as an "SAD period (an example of a second period or, in some cases, a third period)". In the SAD period, the comparator 201 is inverted depending on a result of comparison between the amplified S-signal and the ramp signal which have been input to the comparator 201.

In a period from time t28 to time t29, the signal P_RAMP_RES becomes high, so that the switch 305 is turned on. This causes the reference signal RAMP_O to be reset to the grounding voltage GND.

The period from time t1 to time t29 is a period required to read out pixel signals which a plurality of pixels 101 arranged in any one row of the pixel array portion 100 respectively outputs. This period is denoted as a "1HD period".

Here, the details of a period from time t19 to time t22 included in the NAD period are described.

"Var" shown in FIG. 4 schematically represents variation of inversion timing of the comparator 201 for each column. Thus, "Var" represents variation of AD conversion timing for each column.

At time t19, the reference signal RAMP_O becomes RAMP_O1, so that the comparator 201 of the AD conversion portion 104 for the (4N+1)-th column is inverted. As shown by "Var" in FIG. 4, the inversion timing of the comparator 201 for the (4N+1)-th column varies. The variation occurring at time t19 is denoted as "Var1".

At time t20, the reference signal RAMP_O becomes RAMP_O2, so that the comparator 201 of the AD conversion portion 104 for the (4N+2)-th column is inverted. As shown by "Var" in FIG. 4, the inversion timing of the comparator 201 for the (4N+2)-th column varies as with that at time t19. The variation occurring at time t20 is denoted as "Var2".

At time t21, the reference signal RAMP_O becomes RAMP_O3, so that the comparator 201 of the AD conversion portion 104 for the (4N+3)-th column is inverted. As shown by "Var" in FIG. 4, the inversion timing of the comparator 201 for the (4N+3)-th column varies as with those at time t19 and time t20. The variation occurring at time t21 is denoted as "Var3".

At time t22, the reference signal RAMP_O becomes RAMP_O4, so that the comparator 201 of the AD conversion portion 104 for the (4N+4)-th column is inverted. As shown by "Var" in FIG. 4, the inversion timing of the comparator 201 for the (4N+4)-th column varies as with those at time t19, time t20, and time t21. The variation occurring at time t22 is denoted as "Var4".

Furthermore, in a period from time t18 to time t23, the output of the counter 109 when the comparator 201 for each column has been inverted is then stored in the applicable column memory 106.

In the first exemplary embodiment, while, in the comparator offset period, the capacitative element 306 is charged rapidly, the capacitative element 306 is charged gently in the NAD period. Therefore, Var1, Var2, Var3, and Var4 do not overlap each other.

Here, consider a case where, at the time of charging of the capacitative element 306 in the comparator offset period, the inclination of the reference signal RAMP_O is set equal to the inclination in the NAD period (d1=d2). In this case, the respective intervals between time t19, time t20, time t21, and time t22 become shorter. Then, Var1 and Var2 overlap each other, Var2 and Var3 overlap each other, and Var3 and Var4 overlap each other, so that it is conceivable that the possibility of the number of comparators 201 which are inverted at the same time increasing becomes higher. In this case, the number of columns which are affected by noise caused by comparator inversion may increase, thus deteriorating image quality.

Here, consider a case where, in the comparator offset period, an offset voltage equivalent to Voffset1, Voffset2, Voffset3, and Voffset4 is clamped at the second inclination d2. When a time taken to perform charging at the second inclination d2 is denoted as "ta" and a time taken to perform charging at the first inclination d1 is denoted as "tb", the following formulae hold:

$d2 \times ta = d1 \times tb$, and $$ta = (d1/d2) \times tb \qquad (5).$$

In other words, in a case where the capacitative element 306 has been charged at the second inclination d2, (d1/d2) times as much time as when the capacitative element 306 has been charged at the first inclination d1 may become necessary, so that the 1HD period becomes longer.

Therefore, while, in a case where an offset voltage has been clamped at the same inclination of the reference signal RAMP_O as those in the NAD period and the SAD period, it becomes possible to make a reduction of noise at the time of AD conversion, a frame rate may decrease.

However, in the method described in the first exemplary embodiment, the inclination of the reference signal RAMP_O in the comparator offset period is made larger than the inclination of the reference signal RAMP_O in the AD conversion period. This enables decreasing the number of columns which overlap each other in AD conversion timing without elongating the comparator offset period, so that both low noise and high frame rate are enabled to be satisfied.

Furthermore, in the AD conversion period, a circuit different from the voltage supply circuit 108 illustrated in FIG. 3 can supply a ramp signal as the reference signal RAMP_O to the comparator 201. For example, one wiring through which the reference signal RAMP_O is transferred is provided with a plurality of circuits each having the configuration illustrated in FIG. 3.

One of the plurality of circuits can be set as the voltage supply circuit 108, and the other of the plurality of circuits can be set as a ramp signal supply circuit. Furthermore, the ramp signal supply circuit is assumed to be controlled and driven as with the above-mentioned voltage supply circuit 108.

A configuration of a photoelectric conversion device according to a second exemplary embodiment of the disclosure is described with reference to FIG. 5 and FIG. 6. Furthermore, constituent elements similar to those in the first exemplary embodiment are assigned the respective same reference characters as those in the first exemplary embodiment, and the description of such constituent elements may be omitted or simplified.

In the second exemplary embodiment, the inclination of the reference signal RAMP_O in the comparator offset period is different from that in the first exemplary embodiment. In the first exemplary embodiment, an example in which, at the time of charging of the capacitative element 306 in the comparator offset period, the inclination of the reference signal RAMP_O is the first inclination d1 has been described.

However, in the second exemplary embodiment, an example in which, at the time of charging of the capacitative element 306 in the comparator offset period, the inclination of the reference signal RAMP_O includes not only a single inclination but also a plurality of inclinations is described.

Figure 5:
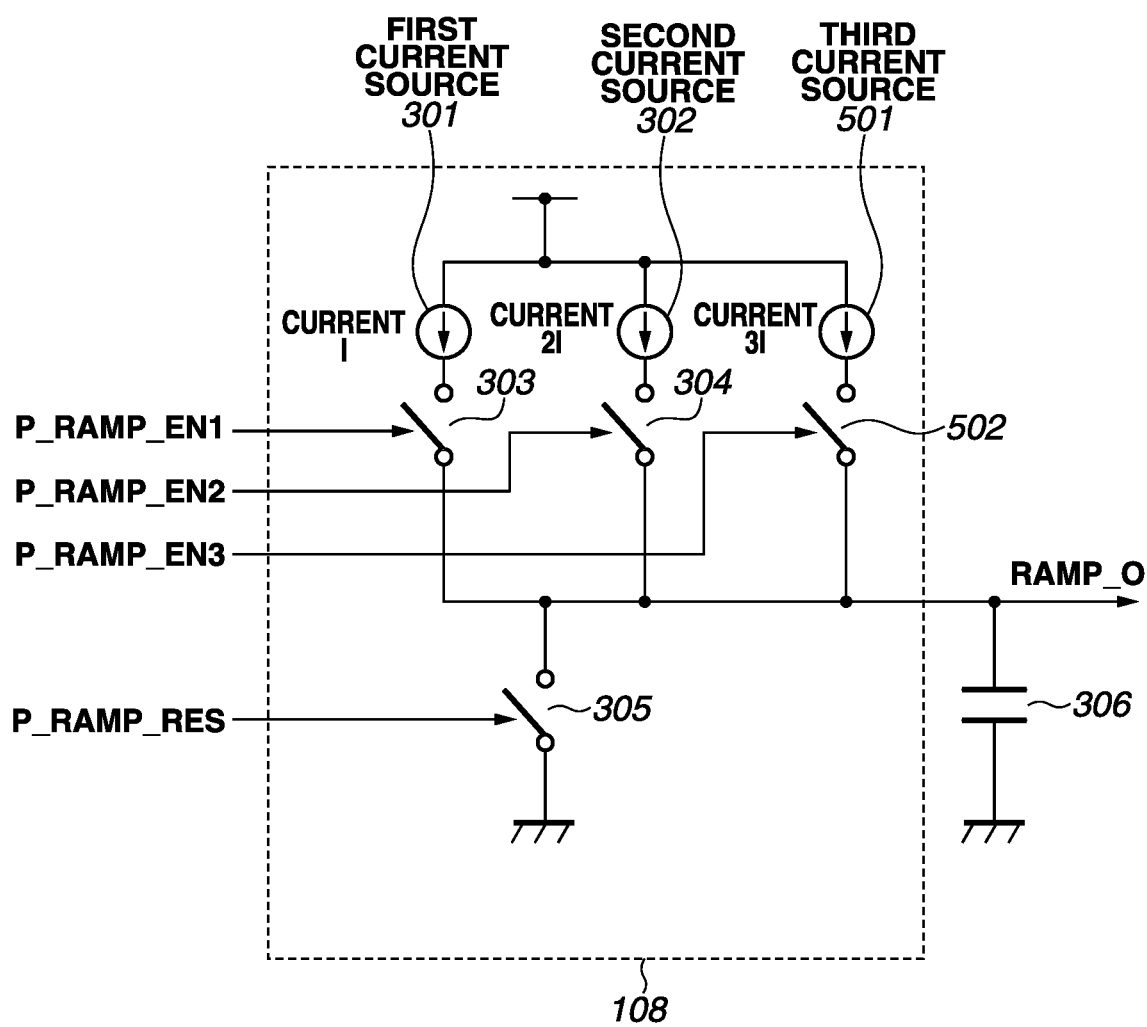
FIG. 5 is a circuit diagram illustrating a photoelectric conversion device according to a second exemplary embodiment.

FIG. 5 is an example of a circuit diagram of a voltage supply circuit 108 according to the second exemplary embodiment.

The configuration illustrated in FIG. 5 is a configuration in which a third current source 501 and a switch 502, which is provided to connect the third current source 501 to the capacitative element 306, are added to the configuration illustrated in FIG. 3. Furthermore, the third current source 501 is a variable current source, which supplies a current the amount of which is variable, as with the first current source 301 and the second current source 302. Although not illustrated in FIG. 1, a signal P_RAMP_EN3 for controlling the switch 502 is assumed to be supplied from the TG 111.

Furthermore, the configuration of the voltage supply circuit 108 is not limited to that illustrated in FIG. 5. For example, in a configuration including a digital-to-analog converter having a plurality of resistors, the digital-to-analog converter is used to switch the resistors. Such driving can be used to generate the reference signal RAMP_O.

Moreover, in the second exemplary embodiment, when the current value of the first current source 301 is denoted as "I", the current value of the second current source 302 is assumed to be 2I, which is twice as much as I, and the current value of the third current source 501 is assumed to be 3I, which is three times as much as I.

Figure 6:
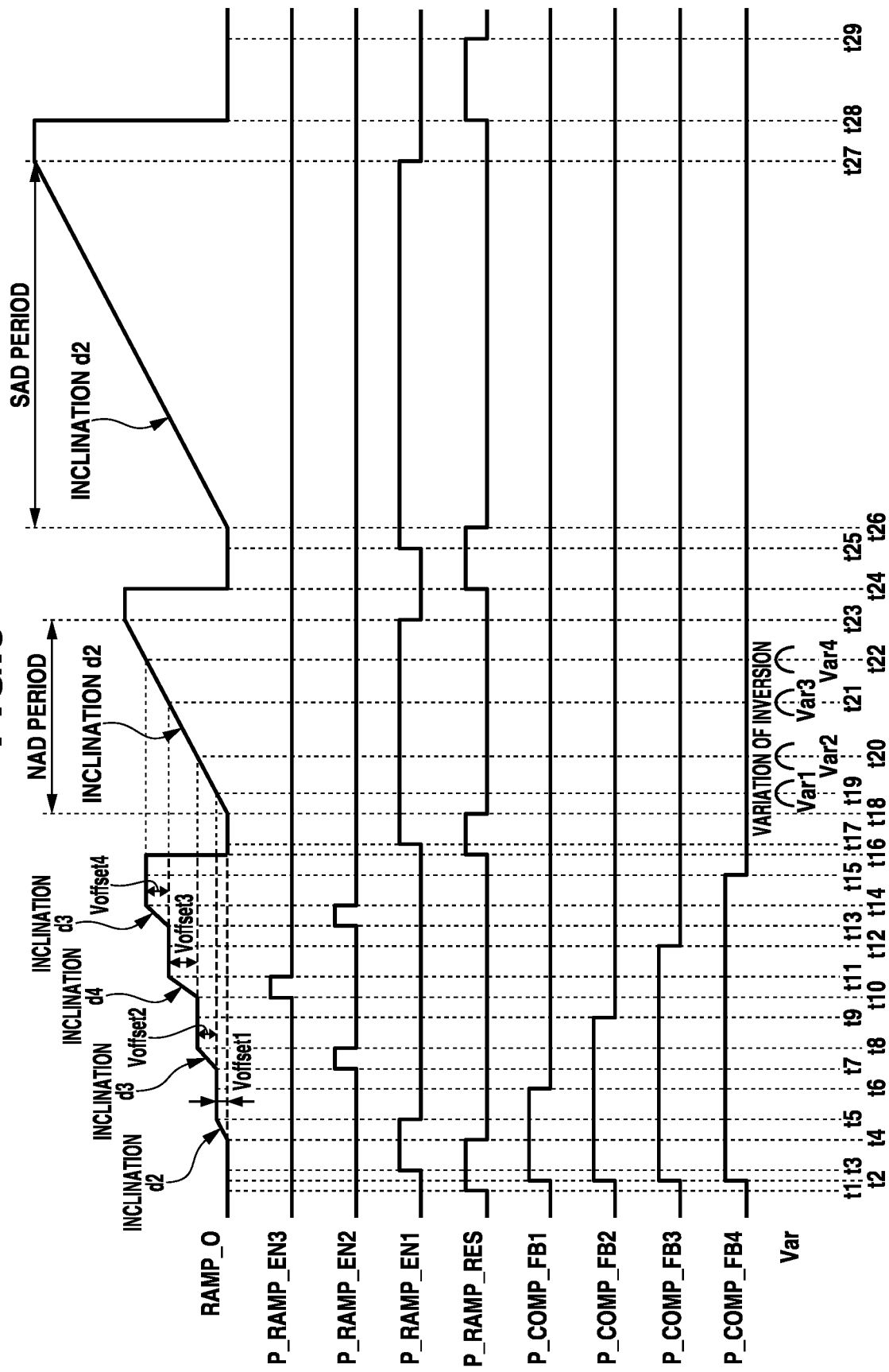
FIG. 6 is a drive timing chart illustrating the photoelectric conversion device according to the second exemplary embodiment.

FIG. 6 is an example of a timing chart illustrating driving of the voltage supply circuit 108 according to the second exemplary embodiment. Furthermore, the content of driving in a period from time t16 to time t29 illustrated in FIG. 6 is the same as that described above with reference to FIG. 4 and is, therefore, omitted from description.

At time t1, the signal P_RAMP_RES becomes high. This causes the switch 305 to be turned on. This causes the voltage of the reference signal RAMP_O to be reset to the grounding voltage GND.

At time t2, the signal P_COMP_FB1, the signal P_COMP_FB2, the signal P_COMP_FB3, and the signal P_COMP_FB4 become high. This causes the switches 204 and 205 of the AD conversion portion 104 to be turned on, so that the comparator 201 is reset.

At time t3, the signal P_RAMP_EN1 becomes high. This causes the switch 303 to be turned on. Accordingly, the first current source 301 supplies a current to the capacitative element 306. However, since the switch 305 is in a turned-on state, charging of the capacitative element 306 is not performed, so that the reference signal RAMP_O remains set to the grounding voltage GND.

At time t4, the signal P_RAMP_RES becomes low, so that the switch 305 is turned off. This causes charging of the capacitative element 306 with a current supplied from the first current source 301 to be started. Here, since the capacitative element 306 is charged by only the first current source 301, the inclination of the reference signal RAMP_O obtained at that time becomes the second inclination d2. Furthermore, the inclination is equivalent to the amount of voltage change of the reference signal RAMP_O per unit time.

At time t5, the signal P_RAMP_EN1 becomes low, so that the switch 303 is turned off. This causes charging of the capacitative element 306 with a current supplied from the first current source 301 to be ended.

As with the first exemplary embodiment, a period in which to perform a series of driving operations for clamping an offset voltage to the comparator 201, such as from time t4 to t16, is denoted as a "comparator offset period". Furthermore, as with the first exemplary embodiment, in the comparator offset period, when an offset voltage is clamped to the comparator 201, charging of the capacitative element 306 is at a stop.

Here, the reference signal RAMP_O obtained when charging of the capacitative element 306 is ended at time t5 is referred to as "RAMP_O1". Moreover, when a voltage used to charge the capacitative element 306 in a period from time t4 to time t5 is denoted as "Voffset1", as with formula (1), the following formula holds:

$$RAMP\_O1 = Voffset1.$$

At time t6, the signal P_COMP_FB1 becomes low. The reference signal RAMP_O1 (Voffset1) and the output of the vertical readout circuit 102 for the (4N+1)-th column at this time t6 are clamped to the capacitative elements 203 and 202 for the (4N+1)-th column, respectively. This causes resetting of the comparator 201 to be completed.

At time t7, the signal P_RAMP_EN2 becomes high, so that the switch 304 is turned on. Additionally, at time t8, the signal P_RAMP_EN2 becomes low, so that the switch 304 is turned off. This causes the capacitative element 306 to be charged again with a current supplied from the second current source 302 in a period from time t7 to time t8. Here, the inclination of the reference signal RAMP_O obtained when the capacitative element 306 is being charged by the second current source 302 is denoted as a "first inclination d3". Furthermore, the inclination is equivalent to the amount of voltage change of the reference signal RAMP_O per unit time. Moreover, the first inclination d3 is larger than the second inclination d2.

Here, the reference signal RAMP_O obtained when charging of the capacitative element 306 is ended at time t8 is denoted as "RAMP_O2". Moreover, when a voltage used to charge the capacitative element 306 in a period from time t7 to time t8 is denoted as "Voffset2", as with formula (2), the following formula holds:

$$RAMP\_O2 = RAMP\_O1 + Voffset2.$$

At time t9, the signal P_COMP_FB2 becomes low. The reference signal RAMP_O2 and the output of the vertical readout circuit 102 for the (4N+2)-th column at this time t9 are clamped to the capacitative elements 203 and 202 for the (4N+2)-th column, respectively. This causes resetting of the comparator 201 to be completed.

At time t10, the signal P_RAMP_EN3 becomes high, so that the switch 502 is turned on.

Additionally, at time t11, the signal P_RAMP_EN3 becomes low, so that the switch 502 is turned off. This causes the capacitative element 306 to be charged again with a current supplied from the third current source 501 in a period from time t10 to time t11. Here, the inclination of the reference signal RAMP_O obtained when the capacitative element 306 is being charged by the third current source 501 is denoted as a "third inclination d4 (third voltage amount)" (third driving state). Furthermore, the inclination is equivalent to the amount of voltage change of the reference signal RAMP_O per unit time. Moreover, the third inclination d4 is larger than each of the first inclination d3 and the second inclination d2.

Here, the reference signal RAMP_O obtained when charging of the capacitative element 306 is ended at time t11 is denoted as "RAMP_O3". Moreover, when a voltage used to charge the capacitative element 306 in a period from time t10 to time t11 is denoted as "Voffset3", as with formula (3), the following formula holds:

RAMP_O3=RAMP_O2+Voffset3.

At time t12, the signal P_COMP_FB3 becomes low. The reference signal RAMP_O3 and the output of the vertical readout circuit 102 for the (4N+3)-th column at this time t12 are clamped to the capacitative elements 203 and 202 for the (4N+3)-th column, respectively. This causes resetting of the comparator 201 to be completed.

At time t13, the signal P_RAMP_EN2 becomes high, so that the switch 304 is turned on.

Additionally, at time t14, the signal P_RAMP_EN2 becomes low, so that the switch 304 is turned off. This causes the capacitative element 306 to be charged again with a current supplied from the second current source 302 in a period from time t13 to time t14. Here, the inclination of the reference signal RAMP_O in this period becomes the first inclination d3 as with the inclination of the reference signal RAMP_O in a period from time t7 to time t8.

Here, the reference signal RAMP_O obtained when charging of the capacitative element 306 is ended at time t14 is denoted as "RAMP_O4". Moreover, when a voltage used to charge the capacitative element 306 in a period from time t13 to time t14 is denoted as "Voffset4", as with formula (4), the following formula holds:

RAMP_O4=RAMP_O3+Voffset4.

At time t15, the signal P_COMP_FB4 becomes low. The reference signal RAMP_O4 and the output of the vertical readout circuit 102 for the (4N+4)-th column at this time t15 are clamped to the capacitative elements 203 and 202 for the (4N+4)-th column, respectively. This causes resetting of the comparator 201 to be completed.

Furthermore, due to the relationship between current values of the respective current sources, the relationship between the second inclination d2, the first inclination d3, and the third inclination d4 is expressed by the following formulae:

$$d3=2d2, \text{ and } d4=3d2 \qquad (6).$$

As described above, in the second exemplary embodiment, the inclination of the reference signal RAMP_O in the comparator offset period is made larger than the inclination of the reference signal RAMP_O in the AD conversion period. This enables decreasing the number of columns which overlap each other in AD conversion timing without elongating the comparator offset period, so that both low noise and high frame rate are enabled to be satisfied.

Additionally, in the second exemplary embodiment, the inclinations of the reference signals RAMP_O in the respective comparator offset periods can be varied. For example, the inclinations of the reference signals RAMP_O can be varied for respective colors of pixel signals which are read out simultaneously.

As an example, consider a case where image capturing has been performed with use of a light source including blue, red, and green. Furthermore, the intensities of the respective colors are assumed to be in a relationship of blue=red<green. Here, the inclination of the reference signal RAMP_O in the case of reading out a pixel column corresponding to blue is denoted as "d2". Moreover, the inclination of the reference signal RAMP_O in the case of reading out a pixel column corresponding to red is denoted as "d3". Moreover, the inclination of the reference signal RAMP_O in the case of reading out a pixel column corresponding to green is denoted as "d4". Additionally, the voltage Voffset in the case of reading out a pixel column corresponding to blue is denoted as "Voffset_B". Moreover, the voltage Voffset in the case of reading out a pixel column corresponding to red is denoted as "Voffset_R". Moreover, the voltage Voffset in the case of reading out a pixel column corresponding to green is denoted as "Voffset_G". In such cases, the following formula holds:

$$\text{Voffset\_B<Voffset\_R<Voffset\_G} \qquad (7),$$

so that, even in a case where the intensities of the respective colors are close to each other, overlapping in inversion timing of the comparator 201 can be reduced. In other words, overlapping in inversion timing of the comparator 201 can be reduced in not only the NAD period but also the SAD period.

Furthermore, while FIG. 6 illustrates an example in which the reference signal RAMP_O has three types of inclinations at the time of charging of the capacitative element 306 in the comparator offset period, the second exemplary embodiment is not limited to this example. The reference signal RAMP_O can have two types of inclinations, or can have four or more types of inclinations. Moreover, at the time of charging of the capacitative element 306 in the comparator offset period, the inclination of the reference signal RAMP_O can be changed in a non-linear manner.

Furthermore, the configuration of the voltage supply circuit 108 illustrated in FIG. 5 is not limited to the above-mentioned example. Depending on the types of inclinations which the reference signal RAMP_O has, the number of current sources and the number of switches for connecting the respective current sources to the capacitative element 306 can be changed as appropriate.

A configuration of a photoelectric conversion device according to a third exemplary embodiment of the disclosure is described with reference to FIG. 7 and FIGS. 8A and 8B. Furthermore, constituent elements similar to those in the first exemplary embodiment and the second exemplary embodiment are assigned the respective same reference characters as those in the first exemplary embodiment and the second exemplary embodiment, and the description of such constituent elements may be omitted or simplified.

The third exemplary embodiment differs from the first exemplary embodiment and the second exemplary embodiment in the charging state of the capacitative element 306 obtained when an offset voltage is clamped to the comparator 201. In the first exemplary embodiment, an example in which charging of the capacitative element 306 is at a stop when an offset voltage is clamped to the comparator 201 has been described. However, in the third exemplary embodiment, an example in which charging of the capacitative element 306 is continuing when an offset voltage is clamped to the comparator 201 is described. Furthermore, the configuration of the voltage supply circuit 108 in the third exemplary embodiment is similar to the configuration in the first exemplary embodiment illustrated in FIG. 3.

FIG. 7 is an example of a timing chart illustrating driving of the voltage supply circuit 108 according to the third exemplary embodiment. Furthermore, the content of driving in a period from time t16 to time t29 illustrated in FIG. 7 is the same as that described above with reference to FIG. 4 and is, therefore, omitted from description.

At time t1, the signal P_RAMP_RES becomes high. This causes the switch 305 to be turned on. This causes the voltage of the reference signal RAMP_O to be reset to the grounding voltage GND.

At time t2, the signal P_COMP_FB1, the signal P_COMP_FB2, the signal P_COMP_FB3, and the signal P_COMP_FB4 become high. This causes the switches 204 and 205 of the AD conversion portion 104 to be turned on, so that the comparator 201 is reset.

At time t3, the signal P_RAMP_EN1 and the signal P_RAMP_EN2 become high. This causes the switches 303 and 304 to be turned on. Accordingly, the first current source 301 and the second current source 302 supply currents to the capacitative element 306. However, since the switch 305 is in a turned-on state, charging of the capacitative element 306 is not performed, so that the reference signal RAMP_O remains set to the grounding voltage GND.

At time t4, the signal P_RAMP_RES becomes low, so that the switch 305 is turned off. This causes charging of the capacitative element 306 with currents supplied from the first current source 301 and the second current source 302 to be started. Here, the inclination of the reference signal RAMP_O obtained when the capacitative element 306 is being charged by both the first current source 301 and the second current source 302 is referred to as a "first inclination d1". Furthermore, the inclination is equivalent to the amount of voltage change of the reference signal RAMP_O per unit time.

Here, in a period from time t4 to time t9, the signal P_RAMP_EN1 and the signal P_RAMP_EN2 remain high. In other words, in this period, the inclination of the reference signal RAMP_O is fixed to the first inclination d1, and charging of the capacitative element 306 with currents supplied from the first current source 301 and the second current source 302 continues.

As with the first exemplary embodiment and the second exemplary embodiment, a period in which to perform a series of driving operations for clamping an offset voltage to the comparator 201, such as from time t4 to t16, is denoted as a "comparator offset period". Furthermore, unlike the first exemplary embodiment and the second exemplary embodiment, in the comparator offset period, when an offset voltage is clamped to the comparator 201, charging of the capacitative element 306 is continuing.

At time t5, the signal P_COMP_FB1 becomes low. Here, the reference signal RAMP_O at time t5 is denoted as "RAMP_O1". Moreover, when a voltage used to charge the capacitative element 306 in a period from time t4 to time t5 is denoted as "Voffset1", as with formula (1), the following formula holds:

RAMP_O1=Voffset1.

At time t5, the reference signal RAMP_O1 (Voffset1) and the output of the vertical readout circuit 102 for the (4N+1)-th column at this time t5 are clamped to the capacitative elements 203 and 202 for the (4N+1)-th column, respectively. This causes resetting of the comparator 201 to be completed.

At time t6, the signal P_COMP_FB2 becomes low. Here, the reference signal RAMP_O at time t6 is denoted as "RAMP_O2". Moreover, when a voltage used to charge the capacitative element 306 in a period from time t5 to time t6 is denoted as "Voffset2", as with formula (2), the following formula holds:

RAMP_O2=RAMP_O1+Voffset2.

At time t6, the reference signal RAMP_O2 and the output of the vertical readout circuit 102 for the (4N+2)-th column at this time t6 are clamped to the capacitative elements 203 and 202 for the (4N+2)-th column, respectively. This causes resetting of the comparator 201 to be completed.

At time t7, the signal P_COMP_FB3 becomes low. Here, the reference signal RAMP_O at time t7 is denoted as "RAMP_O3". Moreover, when a voltage used to charge the capacitative element 306 in a period from time t6 to time t7 is denoted as "Voffset3", as with formula (3), the following formula holds:

RAMP_O3=RAMP_O2+Voffset3.

At time t7, the reference signal RAMP_O3 and the output of the vertical readout circuit 102 for the (4N+3)-th column at this time t7 are clamped to the capacitative elements 203 and 202 for the (4N+3)-th column, respectively. This causes resetting of the comparator 201 to be completed.

At time t8, the signal P_COMP_FB4 becomes low. Here, the reference signal RAMP_O at time t8 is denoted as "RAMP_O4". Moreover, when a voltage used to charge the capacitative element 306 in a period from time t7 to time t8 is denoted as "Voffset4", as with formula (4), the following formula holds:

RAMP_O4=RAMP_O3+Voffset4.

At time t8, the reference signal RAMP_O4 and the output of the vertical readout circuit 102 for the (4N+4)-th column at this time t8 are clamped to the capacitative elements 203 and 202 for the (4N+4)-th column, respectively. This causes resetting of the comparator 201 to be completed.

At time t9, the signal P_RAMP_EN1 and the signal P_RAMP_EN2 become low, so that the switches 303 and 304 are turned off. This causes charging of the capacitative element 306 with currents supplied from the first current source 301 and the second current source 302 to be ended.

As described above, in the third exemplary embodiment, the inclination of the reference signal RAMP_O in the comparator offset period is made larger than the inclination of the reference signal RAMP_O in the AD conversion period. This enables decreasing the number of columns which overlap each other in AD conversion timing without elongating the comparator offset period, so that both low noise and high frame rate are enabled to be satisfied.

Additionally, in the third exemplary embodiment, when an offset voltage is clamped to the comparator 201, charging of the capacitative element 306 with currents supplied from the first current source 301 and the second current source 302 is continued. This driving enables more dispersing "Var" than in the first exemplary embodiment and the second exemplary embodiment. Furthermore, this driving is described in more detail with reference to FIGS. 8A and 8B.

Figure 8A:
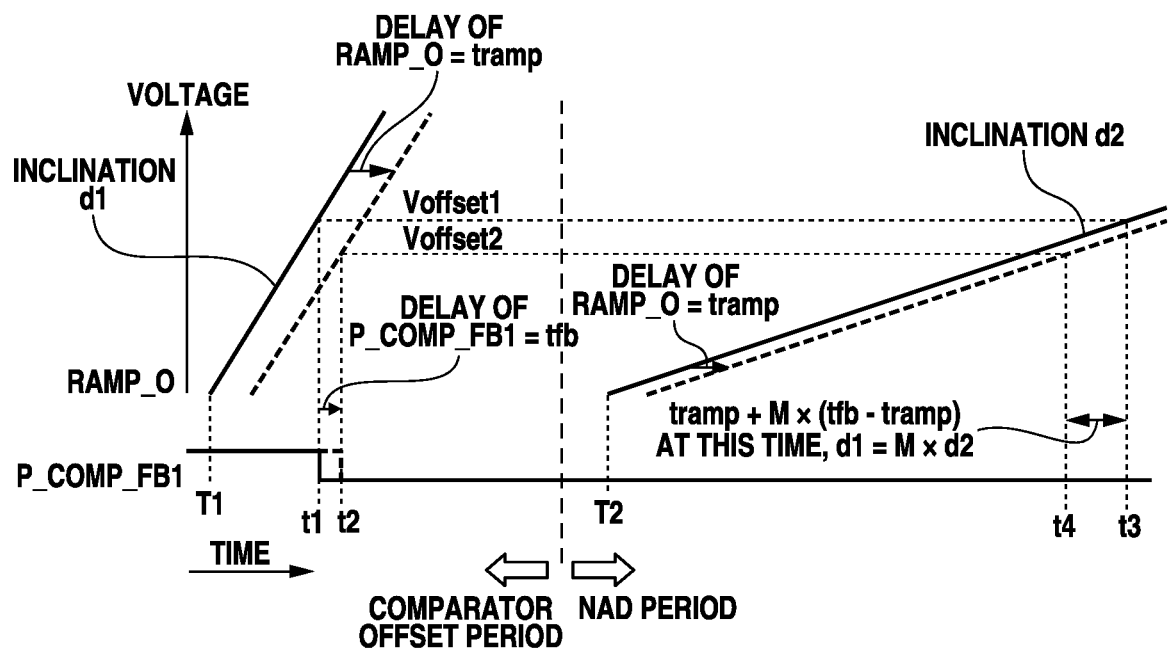
FIGS. 8A and 8B are drive timing charts illustrating the photoelectric conversion device according to the third exemplary embodiment.
Figure 8B:
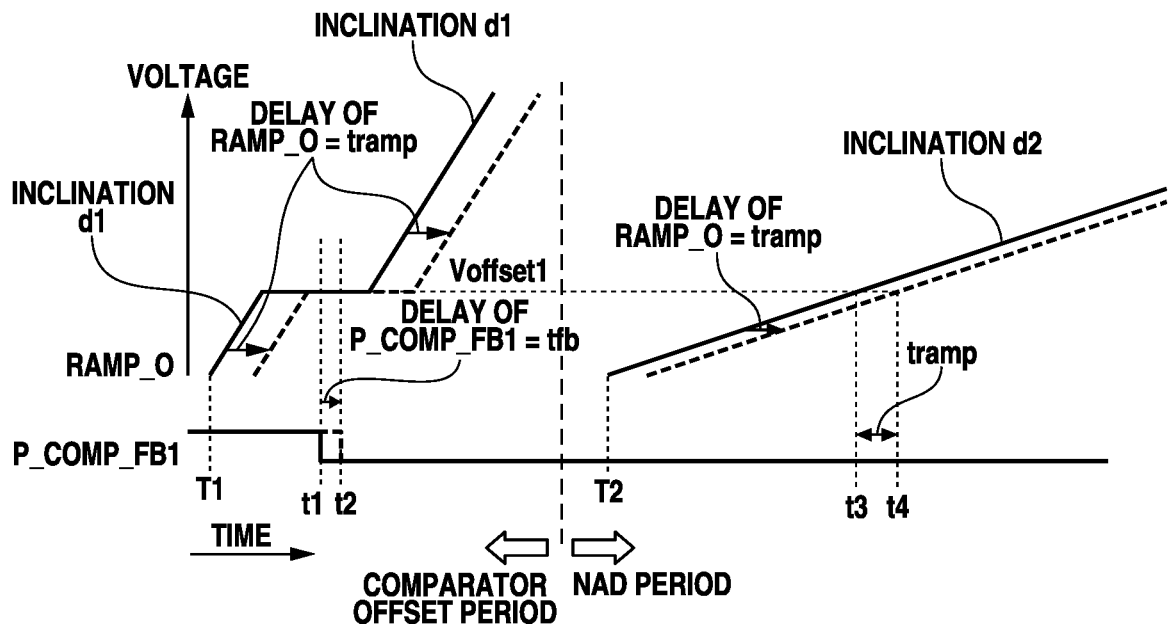

FIGS. 8A and 8B are examples of a timing chart of the reference signal RAMP_O and the signal P_COMP_FB1 focused on the comparator offset period and the NAD period. In FIGS. 8A and 8B, the reference signal RAMP_O and the signal P_COMP_FB1 which are represented by solid lines are, for example, signals which are supplied to the AD conversion circuit 200 for the first column. Moreover, the reference signal RAMP_O and the signal P_COMP_FB1 which are represented by dashed lines are, for example, signals which are supplied to the AD conversion circuit 200 for the fifth column. Furthermore, since the signal P_COMP_FB1 is supplied to the AD conversion circuit 200 for the (4N+1)-th column, circuits for adjacent columns targeted for control by the signal P_COMP_FB1 are equivalent to those for the first column and the fifth column in a case where N is equal to 0 and equal to 1. Therefore, FIGS. 8A and 8B illustrate a combination of the first column and the fifth column as an example.

Moreover, as illustrated in FIGS. 8A and 8B, as compared with a signal which is supplied to the first column, a signal which is supplied to the fifth column has a signal delay occurring due to, for example, a parasitic element. Here, the delay of the reference signal RAMP_O is denoted as "tramp", and the delay of the signal P_COMP_FB1 is denoted as "tfb". Moreover, in the comparator offset period, the time at which supplying of the reference signal RAMP_O to the AD conversion circuit 200 for the first column is started is denoted as "T1". Moreover, in the NAD period, the time at which supplying of the reference signal RAMP_O to the AD conversion circuit 200 for the first column is started is denoted as "T2".

FIG. 8A is an example of a timing chart in a case where, when the signal P_COMP_FB1 is set low, charging of the capacitative element 306 is continuing as in the third exemplary embodiment. In other words, FIG. 8A illustrates a case where, when an offset voltage is clamped to the comparator 201, charging of the capacitative element 306 is continuing.

At time t1, the signal P_COMP_FB1 which is supplied to the AD conversion circuit 200 for the first column becomes low. When the inclination of the reference signal RAMP_O which is supplied to the first column is denoted as a "first inclination d1" and the reference signal RAMP_O at time t1 is denoted as "Voffset1", the following formula holds:

$$\text{Voffset1} = d1 \times (t1 - T1) \tag{8}$$

At time t2, the signal P_COMP_FB1 which is supplied to the AD conversion circuit 200 for the fifth column becomes low. The reference signal RAMP_O which is supplied to the fifth column has the first inclination d1, but is delayed by "tramp" relative to the reference signal RAMP_O which is supplied to the first column. Moreover, when the reference signal RAMP_O at time t2 is denoted as "Voffset2", the following formula holds:

$$\text{Voffset2} = d1 \times (t2 - T1 - \text{tramp}) \tag{9}$$

Next, consider the NAD period. In the comparator offset period, the signal Voffset1 is clamped to the AD conversion circuit 200 for the first column. Therefore, in the NAD period, when the reference signal RAMP_O has indicated a value close to Voffset1, the comparator 201 for the first column is inverted. Moreover, in the comparator offset period, the signal Voffset2 is clamped to the AD conversion circuit 200 for the fifth column. Therefore, in the NAD period, when the reference signal RAMP_O has indicated a value close to Voffset2, the comparator 201 for the fifth column is inverted.

Here, when the inclination of the reference signal RAMP_O in the NAD period is denoted as a "second inclination d2", the reference signal RAMP_O which is supplied to the AD conversion circuit 200 for the first column is expressed by the following formula:

$$\text{RAMP\_O}(t) = d2 \times t \tag{10}$$

At time t3, the reference signal RAMP_O indicates a value close to Voffset1, and the comparator 201 for the first column is inverted. When RAMP_O(t)=Voffset1 and t=t3−T2 are set, with use of formula (10), the following formula holds:

$$\text{Voffset1} = d2 \times (t3 - T2) \tag{11}$$

Additionally, with use of formula (8) and formula (11), the following formula holds:

$$t3 = d1/d2 \times (t1 - T1) + T2 \tag{12}$$

Therefore, the comparator 201 for the first column is inverted at time close to time t3 shown in formula (12).

On the other hand, the reference signal RAMP_O which is supplied to the AD conversion circuit 200 for the fifth column has the second inclination d2, but is delayed by "tramp" relative to the reference signal RAMP_O which is supplied to the first column. The reference signal RAMP_O which is supplied to the AD conversion circuit 200 for the fifth column is expressed by the following formula:

$$\text{RAMP\_O}(t) = d2 \times (t - \text{tramp}) \tag{13}$$

At time t4, the reference signal RAMP_O indicates a value close to Voffset2, and the comparator 201 for the fifth column is inverted. When RAMP_O(t)=Voffset2 and t=t4−T2 are set, with use of formula (13), the following formula holds:

$$\text{Voffset2} = d2 \times (t4 - T2 - \text{tramp}) \tag{14}$$

Additionally, with use of formula (9) and formula (14), the following formula holds:

$$t4 = d1/d2 \times (t2 - T1 - \text{tramp}) + T2 + \text{tramp} \tag{15}$$

Therefore, the comparator 201 for the fifth column is inverted at time close to time t4 shown in formula (15).

As illustrated in FIG. 8A, a difference in inversion timing between the comparators 201 for the first column and the fifth column is expressed by the following formula:

$$t4 - t3 = d1/d2 \times (t2 - t1 - \text{tramp}) + \text{tramp} \tag{16}$$

Furthermore, as the absolute value of the difference between times t4 and t3 becomes larger, the probability of the comparators 201 for the first column and the fifth column overlapping each other in inversion timing decreases. In other words, as the absolute value of the difference between times t4 and t3 becomes larger, the probability of AD conversion timings for the first column and the fifth column overlapping each other decreases.

Here, the signal P_COMP_FB1 which is supplied to the fifth column is delayed by "tfb" relative to the signal P_COMP_FB1 which is supplied to the first column. Therefore, (t2−t1)=tfb is set. Moreover, when d1/d2=M is set, with use of formula (16), the following formula holds:

$$t4 - t3 = M \times (\text{tfb} - \text{tramp}) + \text{tramp} \tag{17}$$

Furthermore, M denotes a ratio between inclinations of the reference signals RAMP_O in the comparator offset period and the NAD period. Although depending on design values of tfb and tramp, the difference (t4−t3) can be adjusted with the setting value of M.

FIG. 8B is an example of a timing chart in a case where charging of the capacitative element 306 is at a stop when the signal P_COMP_FB1 is set low, as in the first exemplary embodiment and the second exemplary embodiment. In other words, FIG. 8B illustrates a case where, when an offset voltage is clamped to the comparator 201, charging of the capacitative element 306 is at a stop.

At time t1, the signal P_COMP_FB1 which is supplied to the AD conversion circuit 200 for the first column becomes low. When the inclination of the reference signal RAMP_O which is supplied to the first column is denoted as a "first inclination d1" as with FIG. 8A and the reference signal RAMP_O at time t1 is denoted as "Voffset1", the following formula holds:

$$\text{Voffset1} = d1 \times (t1 - T1) \tag{18}$$

At time t2, the signal P_COMP_FB1 which is supplied to the AD conversion circuit 200 for the fifth column becomes low. The reference signal RAMP_O which is supplied to the fifth column has the first inclination d1, but is delayed by "tramp" relative to the reference signal RAMP_O which is supplied to the first column. Furthermore, the reference signal RAMP_O at time t2 becomes Voffset1 as with time t1.

Next, consider the NAD period. In the comparator offset period, the signal Voffset1 is clamped to the AD conversion circuit 200 for the first column. Therefore, in the NAD period, when the reference signal RAMP_O has indicated a value close to Voffset1, the comparator 201 for the first column is inverted. Moreover, in the comparator offset period, the signal Voffset1 is also clamped to the AD conversion circuit 200 for the fifth column. Therefore, in the NAD period, when the reference signal RAMP_O has indicated a value close to Voffset1, the comparator 201 for the fifth column is also inverted.

At time t3, the reference signal RAMP_O indicates a value close to Voffset1, and the comparator 201 for the first column is inverted. When the inclination of the reference signal RAMP_O in the NAD period is set as the second inclination d2 as with FIG. 8A and the reference signal RAMP_O at time t3 is set as Voffset1, the following formulae hold:

$$\text{Voffset1} = d2 \times (t3 - T2), \text{ and}$$

$$t3 = \text{Voffset1}/d2 + T2 \quad (19).$$

Therefore, the comparator 201 for the first column is inverted at time close to time t3 shown in formulae (19).

At time t4, the reference signal RAMP_O indicates a value close to Voffset1, and the comparator 201 for the fifth column is inverted. The reference signal RAMP_O which is supplied to the AD conversion circuit 200 for the fifth column has the second inclination d2, but is delayed by "tramp" relative to the reference signal RAMP_O which is supplied to the first column. When the reference signal RAMP_O at time t4 is set as Voffset1, the following formulae hold:

$$\text{Voffset1} = d2 \times (t4 - T2 - \text{tramp}), \text{ and}$$

$$t4 = \text{Voffset1}/d2 + T2 + \text{tramp} \quad (20).$$

Therefore, the comparator 201 for the fifth column is inverted at time close to time t4 shown in formulae (20).

As illustrated in FIG. 8B, a difference in inversion timing between the comparators 201 for the first column and the fifth column is expressed by the following formula:

$$t4 - t3 = \text{tramp} \quad (21).$$

As shown in formula (21), in the first exemplary embodiment and the second exemplary embodiment, a difference in AD conversion timing between adjacent columns is determined only by the delay "tramp" of the reference signal RAMP_O. On the other hand, in the third exemplary embodiment, as shown in formula (17), a difference in AD conversion timing between adjacent columns is determined not only by the delay "tramp" of the reference signal RAMP_O. The difference in AD conversion timing is determined by the ratio M between inclinations of the reference signals RAMP_O in the comparator offset period and the NAD period (=SAD period), the delay of the reference signal RAMP_O, and the delay of the signal P_COMP_FB1.

With regard to formula (17), optionally setting the ratio M between inclinations of the reference signals RAMP_O enables making a difference in AD conversion timing between adjacent columns larger than in formula (21).

As described above, in the third exemplary embodiment, the inclination of the reference signal RAMP_O in the comparator offset period is made larger than the inclination of the reference signal RAMP_O in the AD conversion period. This enables decreasing the number of columns which overlap each other in AD conversion timing without elongating the comparator offset period, so that both low noise and high frame rate are enabled to be satisfied.

Additionally, in the third exemplary embodiment, when an offset voltage is clamped to the comparator 201, charging of the capacitive element 306 is continuing. Therefore, it is possible to make AD conversion timings for adjacent columns which are controlled with the same signal P_COMP_FB1 more separate from each other than in the first exemplary embodiment and the second exemplary embodiment. Accordingly, it is possible to reduce noise superposition which occurs due to AD conversion timings overlapping each other. Moreover, since, even when the signal P_COMP_FB1 becomes low, the inclination of the reference signal RAMP_O is fixed, a required time in the comparator offset period decreases. Accordingly, in the third exemplary embodiment, it is possible to reduce the 1HD period as compared with the first exemplary embodiment and the second exemplary embodiment.

A configuration of a photoelectric conversion device according to a fourth exemplary embodiment of the disclosure is described with reference to FIG. 9. Furthermore, constituent elements similar to those in the first exemplary embodiment to the third exemplary embodiment are assigned the respective same reference characters as those in the first exemplary embodiment to the third exemplary embodiment, and the description of such constituent elements may be omitted or simplified.

The fourth exemplary embodiment is an embodiment obtained by combining the second exemplary embodiment and the third exemplary embodiment. In other words, in the fourth exemplary embodiment, the inclination of the reference signal RAMP_O in the comparator offset period includes a plurality of inclinations. Additionally, in the fourth exemplary embodiment, when an offset voltage is clamped to the comparator 201, charging of the capacitive element 306 is continued. Furthermore, the configuration of the voltage supply circuit 108 in the fourth exemplary embodiment is similar to the configuration in the first exemplary embodiment illustrated in FIG. 3.

Figure 9:
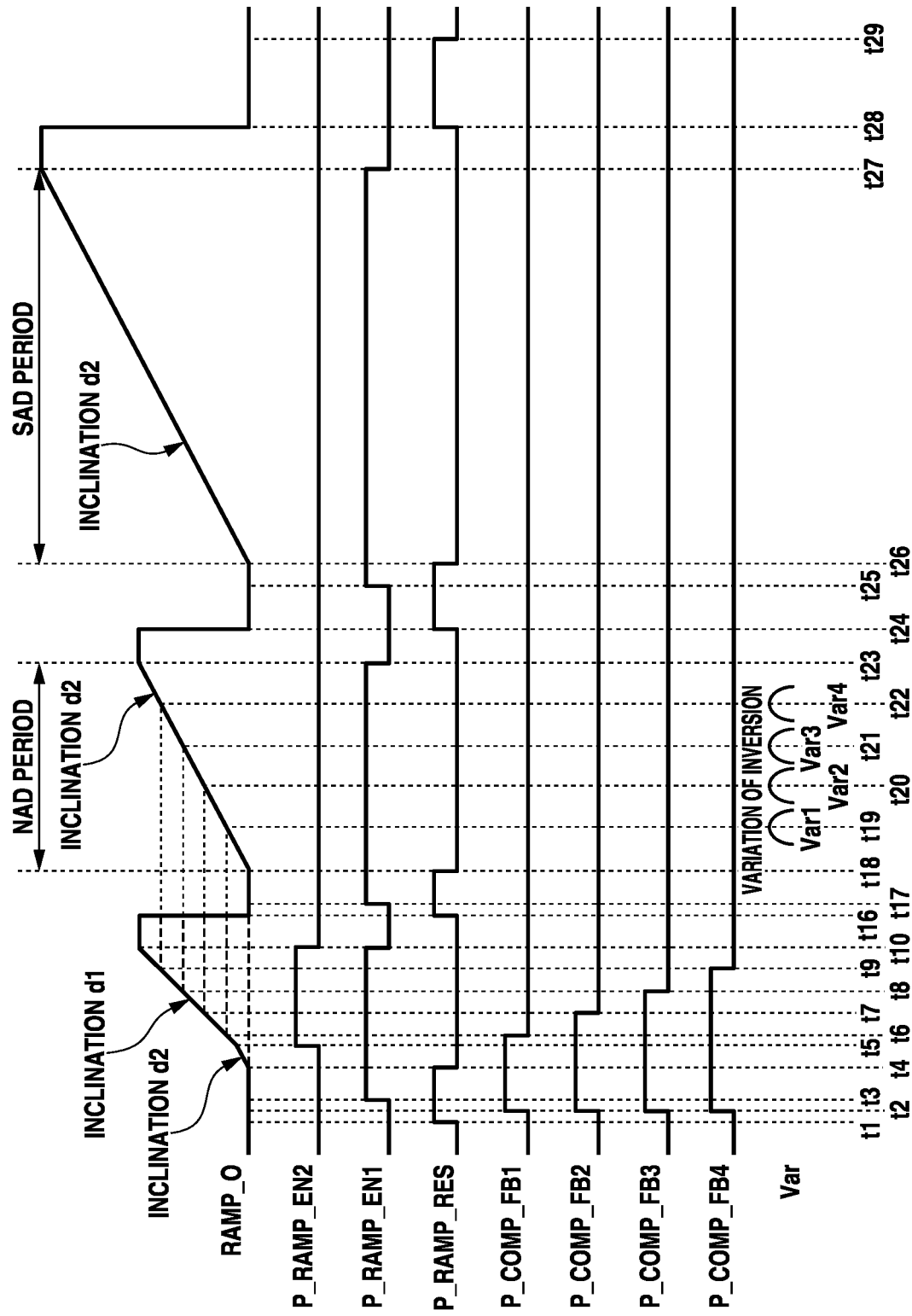
FIG. 9 is a drive timing chart illustrating a photoelectric conversion device according to a fourth exemplary embodiment.

FIG. 9 is an example of a timing chart illustrating driving of the voltage supply circuit 108 according to the fourth exemplary embodiment. Furthermore, the content of driving in a period from time t16 to time t29 illustrated in FIG. 9 is the same as that described above with reference to FIG. 4 and is, therefore, omitted from description.

At time t1, the signal P_RAMP_RES becomes high. This causes the switch 305 to be turned on. This causes the voltage of the reference signal RAMP_O to be reset to the grounding voltage GND.

At time t2, the signal P_COMP_FB1, the signal P_COMP_FB2, the signal P_COMP_FB3, and the signal P_COMP_FB4 become high. This causes the switches 204 and 205 of the AD conversion portion 104 to be turned on, so that the comparator 201 is reset.

At time t3, the signal P_RAMP_EN1 becomes high. This causes the switch 303 to be turned on. Accordingly, the first current source 301 supplies a current to the capacitive element 306. However, since the switch 305 is in a turned-on state, charging of the capacitive element 306 is not performed, so that the reference signal RAMP_O remains set to the grounding voltage GND.

At time t4, the signal P_RAMP_RES becomes low, so that the switch 305 is turned off. This causes charging of the capacitive element 306 with a current supplied from the first current source 301 to be started. Here, since the capacitive element 306 is charged by only the first current source 301, the inclination of the reference signal RAMP_O obtained at that time becomes the second inclination d2. Furthermore, the inclination is equivalent to the amount of voltage change of the reference signal RAMP_O per unit time.

At time t5, the signal P_RAMP_EN2 becomes high. This causes the switch 304 to be turned on. Accordingly, the second current source 302 supplies a current to the capacitive element 306. This causes the capacitative element 306 to be charged with not only a current supplied from the first current source 301 but also a current supplied from the second current source 302. Here, since the capacitative element 306 is charged by the first current source 301 and the second current source 302, the inclination of the reference signal RAMP_O at that time becomes the first inclination d1.

Furthermore, in a period from time t5 to time t10, the signal P_RAMP_EN1 and the signal P_RAMP_EN2 remain high. In other words, in this period, the inclination of the reference signal RAMP_O is fixed to the first inclination d1. Then, charging of the capacitative element 306 with currents supplied from the first current source 301 and the second current source 302 continues.

As with the first exemplary embodiment to the third exemplary embodiment, a period in which to perform a series of driving operations for clamping an offset voltage to the comparator 201, such as from time t4 to t16, is denoted as a "comparator offset period". Furthermore, unlike the first exemplary embodiment and the second exemplary embodiment, in the comparator offset period, when an offset voltage is clamped to the comparator 201, charging of the capacitative element 306 is continuing.

The subsequent driving operations are similar to those in the third exemplary embodiment described with reference to FIG. 7, and the description thereof are, therefore, simplified. At time t6, time t7, time t8, and time t9, the signal P_COMP_FB1, the signal P_COMP_FB2, the signal P_COMP_FB3, and the signal P_COMP_FB4 become low in sequence. Then, the reference signal RAMP_O and the output of the vertical readout circuit 102 for each column are clamped to the capacitative elements 203 and 202 for each column, respectively. This causes resetting of the comparator 201 to be completed. At time t10, the signal P_RAMP_EN1 and the signal P_RAMP_EN2 become low, so that the switches 303 and 304 are turned off. This causes charging of the capacitative element 306 with currents supplied from the first current source 301 and the second current source 302 to be ended.

As described above, in the fourth exemplary embodiment, the inclination of the reference signal RAMP_O in the comparator offset period is made larger than the inclination of the reference signal RAMP_O in the AD conversion period. This enables decreasing the number of columns which overlap each other in AD conversion timing without elongating the comparator offset period, so that both low noise and high frame rate are enabled to be satisfied.

Additionally, in the fourth exemplary embodiment, when an offset voltage is clamped to the comparator 201, charging of the capacitative element 306 with currents supplied from the first current source 301 and the second current source 302 is continued. This driving enables more dispersing "Var" than in the first exemplary embodiment and the second exemplary embodiment.

Additionally, in the fourth exemplary embodiment, the inclination of the reference signal RAMP_O in each comparator offset period is varied as appropriate. This also enables reducing overlapping in inversion timing of the comparator 201 in not only the NAD period but also the SAD period.

Furthermore, while FIG. 9 illustrates an example in which the reference signal RAMP_O has two types of inclinations in the comparator offset period, the fourth exemplary embodiment is not limited to this example. The reference signal RAMP_O can have three or more types of inclinations. Moreover, in the comparator offset period, the inclination of the reference signal RAMP_O can be changed in a non-linear manner.

Furthermore, the configuration of the voltage supply circuit 108 in the fourth exemplary embodiment such as that illustrated in FIG. 3 is not limited to the above-mentioned example. Depending on the types of inclinations which the reference signal RAMP_O has, the number of current sources and the number of switches for connecting the respective current sources to the capacitative element 306 can be changed as appropriate.

Figure 10A:
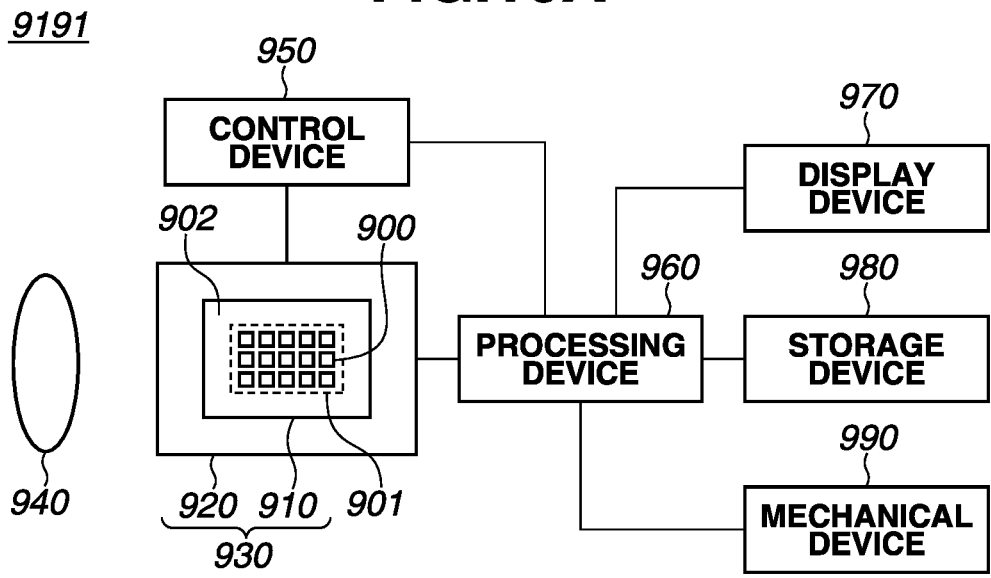
FIGS. 10A, 10B, and 10C are schematic diagrams illustrating apparatuses according to a fifth exemplary embodiment.

A fifth exemplary embodiment can be applied to any one of the first exemplary embodiment to the fourth exemplary embodiment. FIG. 10A is a schematic diagram used to explain an apparatus 9191 including a semiconductor assembly 930 according to the fifth exemplary embodiment. A photoelectric conversion device described above in each exemplary embodiment can be used as the semiconductor assembly 930. The apparatus 9191 including the semiconductor assembly 930 is described in detail. The whole or a part of the semiconductor assembly 930 is a semiconductor device 910. The semiconductor assembly 930 in the fifth exemplary embodiment can be used as, for example, an image sensor, an autofocus (AF) sensor, a light metering sensor, or a distance measuring sensor. The semiconductor device 910 has a pixel area 901 in which pixel circuits 900 each including a photoelectric conversion portion are arrayed in matrix form. The semiconductor device 910 can include a peripheral area 902 around the pixel area 901. The peripheral area 902 allows circuits other than the pixel circuits 900 to be arranged therein.

The semiconductor assembly 930 can include, besides the semiconductor device 910, a package 920, which contains the semiconductor device 910. The package 920 can include a substrate to which the semiconductor device 910 is fixed and a cover body such as a glass member which is located opposite to the semiconductor device 910. The package 920 can further include a joining member, such as a bonding wire or bump, which interconnects a terminal provided in the substrate and a terminal provided in the semiconductor device 910.

The apparatus 9191 can include at least one of an optical device 940, a control device 950, a processing device 960, a display device 970, a storage device 980, and a mechanical device 990. The optical device 940 is associated with the semiconductor assembly 930. The optical device 940 includes, for example, a lens, a shutter, and a mirror. The control device 950 controls the semiconductor assembly 930. The control device 950 is a semiconductor device such as an application specific integrated circuit (ASIC).

The processing device 960 processes a signal output from the semiconductor assembly 930. The processing device 960 is a semiconductor device, such as a central processing unit (CPU) or an ASIC, which constitutes an analog front-end (AFE) or a digital front-end (DFE). The display device 970 is an electroluminescence (EL) display device or a liquid crystal display device, which displays information (image) obtained by the semiconductor assembly 930. The storage device 980 is a magnetic device or a semiconductor device, which stores information (image) obtained by the semiconductor assembly 930. The storage device 980 is a volatile memory, such as a static random access memory (SRAM) or a dynamic random access memory (DRAM), or a nonvolatile memory, such as a flash memory or a hard disk drive.

The mechanical device 990 includes a moving element or a propulsion element, such as a motor or an engine. In the apparatus 9191, a signal output from the semiconductor assembly 930 is displayed on the display device 970 or is transmitted to the outside by a communication device (not illustrated) included in the apparatus 9191. Therefore, it is favorable that the apparatus 9191 further includes, separately from a storage circuit or an arithmetic circuit included in the semiconductor assembly 930, the storage device 980 or the processing device 960. The mechanical device 990 can be controlled based on a signal output from the semiconductor assembly 930.

Moreover, the apparatus 9191 is suitable for an electronic apparatus, such as an information terminal having an image capturing function (for example, a smartphone or a wearable terminal) or a camera (for example, a lens-interchangeable camera, a compact camera, a video camera, or a monitoring camera). The mechanical device 990 included in the camera is able to drive components of the optical device 940 for zooming, focusing, and shutter operations. Alternatively, the mechanical device 990 included in the camera is able to move the semiconductor assembly 930 for an image stabilizing operation.

Moreover, the apparatus 9191 can be transport equipment, such as a vehicle, a ship or boat, or a flight vehicle. The mechanical device 990 included in the transport equipment can be used as a moving apparatus. The apparatus 9191 serving as transport equipment is suitable for an apparatus which transports the semiconductor assembly 930 or an apparatus which performs assistance of driving (handling) and/or autonomous operation with use of an image capturing function. The processing device 960 for use in assistance of driving (handling) and/or autonomous operation is able to perform processing for operating the mechanical device 990 serving as a moving apparatus based on information obtained by the semiconductor assembly 930. Alternatively, the apparatus 9191 can be medical equipment, such as an endoscope, measuring equipment, such as a distance measuring sensor, analytical equipment, such as an electron microscope, business equipment, such as a copying machine, or industrial equipment, such as a robot.

According to each of the above-described exemplary embodiments, it becomes possible to obtain good pixel characteristics. Accordingly, it is possible to increase the value of the semiconductor assembly. Increasing the value mentioned here corresponds to at least one of addition of a function, improvement of performance, improvement of characteristics, improvement of reliability, improvement of fabrication yield, reduction of environmental load, reduction in cost, reduction in size, and reduction in weight.

Accordingly, if the semiconductor assembly 930 according to the fifth exemplary embodiment is used for the apparatus 9191, it is also possible to increase the value of the apparatus 9191. For example, if the semiconductor assembly 930 is mounted on transport equipment, it is possible to obtain an excellent performance in performing image capturing of the surroundings of the transport equipment or measurement of the external environment thereof. Therefore, in the conduct of manufacturing and selling of the transport equipment, determining to mount, on the transport equipment, the semiconductor assembly 930 according to the fifth exemplary embodiment is beneficial for increasing the performance of the transport equipment itself. Particularly, the semiconductor assembly 930 is suitable for transport equipment which performs drive assist and/or autonomous driving of the transport equipment with use of information obtained by the semiconductor assembly 930.

Moreover, a photoelectric conversion system and a moving body according to the fifth exemplary embodiment are described with reference to FIGS. 10B and 10C.

Figure 10B:
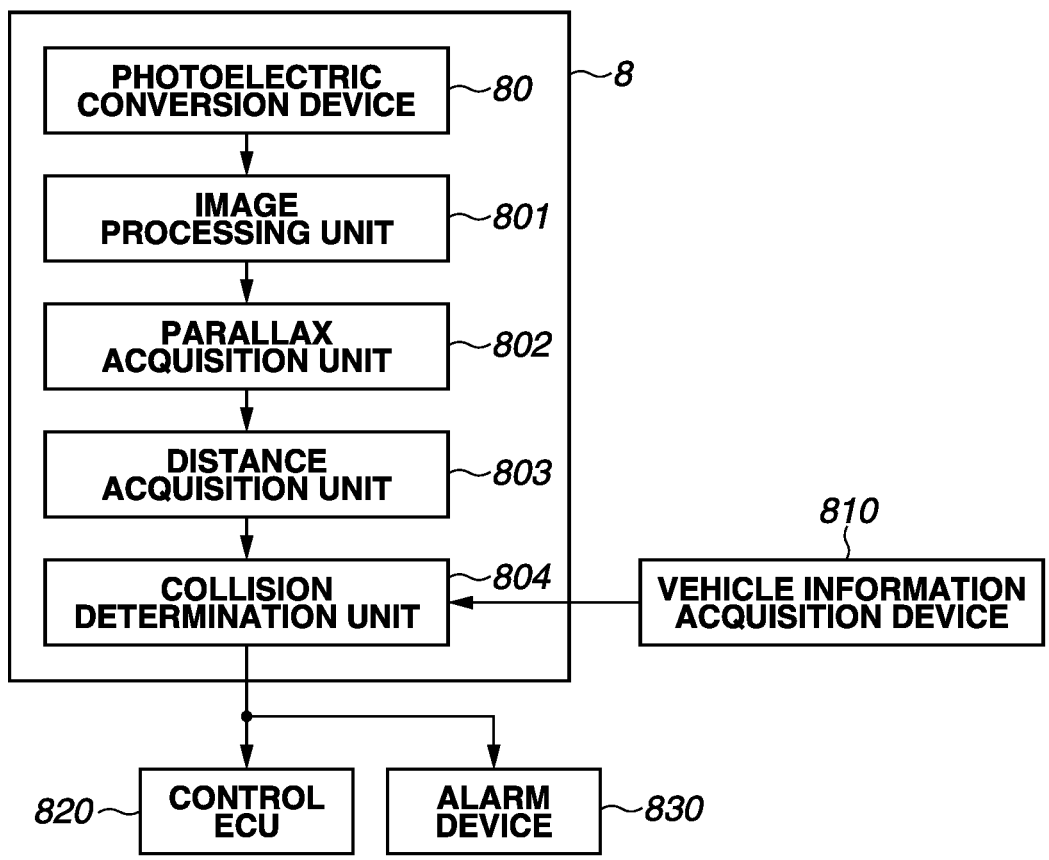

FIG. 10B illustrates an example of a photoelectric conversion system, which is associated with a vehicle-mounted camera. The photoelectric conversion system 8 includes a photoelectric conversion device 80. The photoelectric conversion device 80 is any one of the photoelectric conversion devices (imaging devices) described in the above-described exemplary embodiments. The photoelectric conversion system 8 further includes an image processing unit 801, which performs image processing on a plurality of pieces of image data acquired by the photoelectric conversion device 80, and a parallax acquisition unit 802, which calculates parallax (a phase difference between parallax images) from a plurality of pieces of image data acquired by the photoelectric conversion system 8. Moreover, the photoelectric conversion system 8 further includes a distance acquisition unit 803, which calculates a distance from the photoelectric conversion system 8 to a target object based on the calculated parallax, and a collision determination unit 804, which determines whether there is a collision possibility based on the calculated distance. Here, the parallax acquisition unit 802 or the distance acquisition unit 803 is an example of a distance information acquisition unit configured to acquire distance information indicating a distance from the photoelectric conversion system 8 to a target object. Thus, the distance information is information concerning, for example, parallax, the amount of defocus, or a distance to a target object. The collision determination unit 804 can determine a collision possibility using any one of these pieces of distance information. The distance information acquisition unit can be implemented by hardware designed for exclusive use or can be implemented by a software module. Moreover, the distance information acquisition unit can be implemented by, for example, a field programmable gate array (FPGA) or an application specific integrated circuit (ASIC), or can be implemented by a combination of these.

The photoelectric conversion system 8 is connected to a vehicle information acquisition device 810 and is thus able to acquire vehicle information, such as vehicle speed, yaw rate, and steering angle. Moreover, the photoelectric conversion system 8 is connected to a control electronic control unit (ECU) 820, which is a control device for outputting a control signal to generate braking force on a vehicle based on a result of determination by the collision determination unit 804. Moreover, the photoelectric conversion system 8 is also connected to an alarm device 830, which alarms a driver based on a result of determination by the collision determination unit 804. For example, in a case where the collision possibility is high as a result of determination by the collision determination unit 804, the control ECU 820 performs vehicle control to avoid a collision and reduce damage by, for example, applying the brakes, returning an accelerator pedal, or reducing engine output. The alarm device 830 issues a warning to a user by, for example, sounding an alarm such as sound, displaying alarm information on a screen of, for example, a car navigation system, or applying a vibration to a shoulder harness or a steering wheel.

In the fifth exemplary embodiment, the photoelectric conversion system 8 captures an image of the surroundings of a vehicle, such as a view in front of or behind the vehicle.

Figure 10C:
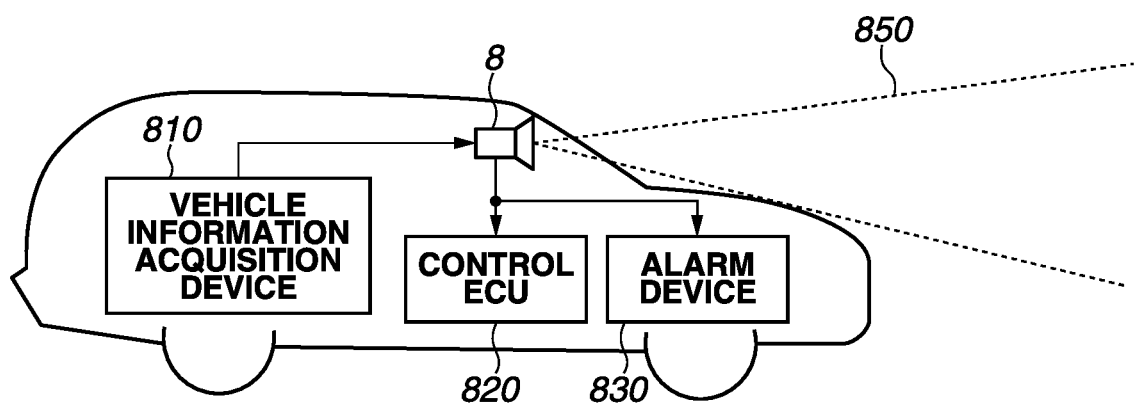

FIG. 10C illustrates the photoelectric conversion system 8, which is used to capture an image of the view in front of the vehicle (an image capturing range 850). The vehicle information acquisition device 810 issues an instruction to the photoelectric conversion system 8 or the photoelectric conversion device 80. This configuration enables further improving the accuracy of distance measurement.

While, in the above description, the present exemplary embodiment is applied to an example of a control operation for preventing collision with another vehicle, the present exemplary embodiment is also applicable to, for example, a control operation for performing automated driving to follow another vehicle or a control operation for performing automated driving to keep the lane. Moreover, the photoelectric conversion system can be applied to not only a vehicle such as a car but also a moving body (a moving apparatus), such as a ship or boat, an airplane, or an industrial robot. Additionally, the photoelectric conversion system can be applied to not only the moving body but also an apparatus which widely uses object recognition, such as an intelligent transport system (ITS).

The above-described exemplary embodiments can be modified or altered as appropriate within a range which does not depart from the technical idea. Furthermore, the disclosure content of the present specification includes not only contents described in the present specification but also all of the particulars derivable from the present specification and the drawings accompanied by the present specification. Moreover, the disclosure content of the present specification includes the complement of a concept described in the present specification. Thus, if, in the present specification, for example, there is a description indicating that "A is larger than B", even if a description indicating that "A is not larger than B" is omitted, it can be said that the present specification also discloses that "A is not larger than B". This is because, in a case where there is a description indicating that "A is larger than B", it is premised that a case where "A is not larger than B" is taken into consideration.

According to the present disclosure, in a photoelectric conversion device capable of outputting a high-quality signal, it is possible to prevent or reduce a decrease in frame rate.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-123185 filed Aug. 2, 2022, which is hereby incorporated by reference herein in its entirety.

What is claimed is:

1. A photoelectric conversion device comprising:
   pixels arranged in matrix form and each configured to generate a pixel signal by photoelectric conversion;
   a plurality of analog-to-digital (AD) conversion circuits each including a comparator configured to make a comparison between the pixel signal and a ramp signal;
   a voltage supply circuit configured to supply an offset voltage for setting a respective different offset to the comparator included in each of the plurality of AD conversion circuits; and
   a control unit configured to control the ramp signal and the offset voltage,
   wherein, in a first period in which the respective different offset voltage is supplied to the comparator included in each of the plurality of AD conversion circuits, the control unit performs control to bring the offset voltage into a first driving state in which a voltage change amount per unit time of the offset voltage is a first voltage amount,
   wherein, in a second period in which the ramp signal is supplied to the comparator included in each of the plurality of AD conversion circuits, the control unit performs control to bring the ramp signal into a second driving state in which a voltage change amount per unit time of the ramp signal is a second voltage amount, and
   wherein the first voltage amount is larger the second voltage amount.

2. The photoelectric conversion device according to claim 1, wherein, in the first period, the control unit performs control to bring the offset voltage into the second driving state in which a voltage change amount per unit time of the offset voltage is the second voltage amount.

3. The photoelectric conversion device according to claim 2,
   wherein, in the first period, each of the plurality of AD conversion circuits is capable of performing an offset clamp operation based on the offset voltage, and
   wherein, during the offset clamp operation, the control unit performs control to bring the offset voltage into the first driving state.

4. The photoelectric conversion device according to claim 1, wherein, in the first period, the control unit performs control to bring the offset voltage into a third driving state in which a voltage change amount per unit time of the offset voltage is a third voltage amount larger than the first voltage amount.

5. The photoelectric conversion device according to claim 1,
   wherein, in the first period, each of the plurality of AD conversion circuits is capable of performing an offset clamp operation based on the offset voltage, and
   wherein, during the offset clamp operation, the control unit performs control to bring the offset voltage into the first driving state.

6. The photoelectric conversion device according to claim 1, wherein the second period further includes a third period which is a period for AD-converting a signal at reset level which each of the pixels has output and which is a period for AD-converting a photoelectric conversion signal which each of the pixels has output.

7. The photoelectric conversion device according to claim 1,
   wherein each of the plurality of AD conversion circuits includes, in addition to the comparator, a first capacitive element and a second capacitive element, and
   wherein the comparator has a first input terminal and a second input terminal, the pixel signal being input to the first input terminal via the first capacitive element and the ramp signal being input to the second input terminal via the second capacitive element.

8. The photoelectric conversion device according to claim 1,
   wherein the voltage supply circuit includes a third capacitive element and a current source configured to supply a current to the third capacitive element, and
   wherein the current source includes a plurality of current sources.

9. The photoelectric conversion device according to claim 1, wherein the voltage supply circuit supplies the ramp signal.

10. An apparatus comprising the photoelectric conversion device according to claim 1, the apparatus further comprising at least one of:
an optical device associated with the photoelectric conversion device;
a control device configured to control the photoelectric conversion device;
a processing device configured to process a signal output from the photoelectric conversion device;
a display device configured to display information acquired by the photoelectric conversion device;
a storage device configured to store information acquired by the photoelectric conversion device; and
a mechanical device configured to operate based on information acquired by the photoelectric conversion device.

11. A driving method for a photoelectric conversion device including pixels arranged in matrix form and each configured to generate a pixel signal by photoelectric conversion, and a plurality of analog-to-digital (AD) conversion circuits each including a comparator configured to make a comparison between the pixel signal and a ramp signal, the driving method comprising:
supplying an offset voltage for setting a respective different offset to the comparator included in each of the plurality of AD conversion circuits;
in a first period in which the respective different offset voltage is supplied to the comparator included in each of the plurality of AD conversion circuits, setting a voltage change amount per unit time of the offset voltage to a first voltage amount; and
in a second period in which the ramp signal is supplied to the comparator included in each of the plurality of AD conversion circuits, setting a voltage change amount per unit time of the ramp signal to a second voltage amount,
wherein the first voltage amount is larger the second voltage amount.

12. The driving method according to claim 11, further comprising, in the first period, setting a voltage change amount per unit time of the offset voltage to the second voltage amount.

13. The driving method according to claim 12,
wherein, in the first period, each of the plurality of AD conversion circuits performs an offset clamp operation based on the offset voltage, and
wherein the driving method further comprises, during the offset clamp operation, setting a voltage change amount per unit time of the offset voltage to the first voltage amount.

14. The driving method according to claim 11, further comprising, in the first period, setting a voltage change amount per unit time of the offset voltage to a third voltage amount larger than the first voltage amount.

15. The driving method according to claim 11,
wherein, in the first period, each of the plurality of AD conversion circuits performs an offset clamp operation based on the offset voltage, and
wherein the driving method further comprises, during the offset clamp operation, setting a voltage change amount per unit time of the offset voltage to the first voltage amount.

16. The driving method according to claim 11, wherein the second period further includes a third period which is a period for AD-converting a signal at reset level which each of the pixels has output and which is a period for AD-converting a photoelectric conversion signal which each of the pixels has output.

17. The driving method according to claim 11,
wherein each of the plurality of AD conversion circuits includes, in addition to the comparator, a first capacitative element and a second capacitative element, and
wherein the comparator has a first input terminal and a second input terminal, the pixel signal being input to the first input terminal via the first capacitative element and the ramp signal being input to the second input terminal via the second capacitative element.

18. The driving method according to claim 11, further comprising:
performing an offset clamp operation based on the offset voltage, in the first period, by each of the plurality of AD conversion circuits; and
performing control to bring the offset voltage into the first driving state, during the offset clamp operation.

19. The driving method according to claim 11, further comprising supplying a current to the third capacitative element,
wherein the current source includes a plurality of current sources.

20. The driving method according to claim 11, wherein the ramp signal is supplied by a voltage supply circuit.

* * * * *